(12) United States Patent
Nagato et al.

(10) Patent No.: US 8,810,754 B2
(45) Date of Patent: Aug. 19, 2014

(54) INTERFERENCE FILTER AND DISPLAY DEVICE

(75) Inventors: Hitoshi Nagato, Tokyo (JP); Takashi Miyazaki, Kanagawa-ken (JP); Yutaka Nakai, Kanagawa-ken (JP); Hajime Yamaguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 108 days.

(21) Appl. No.: 13/491,966

(22) Filed: Jun. 8, 2012

(65) Prior Publication Data

US 2013/0077029 A1    Mar. 28, 2013

(30) Foreign Application Priority Data

Sep. 28, 2011    (JP) .................................. 2011-212040

(51) Int. Cl.
*G02F 1/1335*    (2006.01)

(52) U.S. Cl.
USPC ......................................................... 349/105

(58) Field of Classification Search
CPC .......... G02B 5/201; G02B 5/28; G02B 5/286; G02B 5/3041; H01L 27/14; H01L 51/5271; H01L 51/5215; H04N 9/07; G02F 1/133615; G02F 1/133514; G02F 1/1335; G02F 1/133609; G02F 1/133611; G02F 1/133621; G02F 1/133555; G02F 2001/133521; G02F 2001/133624; G01J 3/51; G02C 7/107
USPC ........ 353/20, 31; 349/105, 62, 106, 107, 114, 349/138, 65; 359/359, 584, 589, 590; 348/60; 362/231, 235, 293, 97.1, 97.2, 362/311.01; 345/589, 87
See application file for complete search history.

(56) References Cited

U.S. PATENT DOCUMENTS

| 4,924,356 A | 5/1990 | French et al. |
| 2012/0038848 A1 | 2/2012 | Nagato et al. |
| 2013/0188253 A1 | 7/2013 | Nakai et al. |

FOREIGN PATENT DOCUMENTS

| JP | 2008-21866 | 1/2008 |
| JP | 2008-304696 | 12/2008 |
| WO | 2011/083513 A1 | 7/2011 |
| WO | 2011/089646 A1 | 7/2011 |

OTHER PUBLICATIONS

U.S. Appl. No. 13/423,376, filed Mar. 19, 2012, Hitoshi Nagato, et al.
Korean Office Action issued Nov. 14, 2013, in Korea Patent Application No. 10-2012-0071017 (with English translation).

(Continued)

*Primary Examiner* — Thoi Duong
(74) *Attorney, Agent, or Firm* — Oblon, Spivak, McClelland, Maier & Neustadt, L.L.P.

(57) ABSTRACT

According to one embodiment, an interference filter includes a base body, a lower semi-transmissive layer, and an upper semi-transmissive layer. The base body includes a major surface. The lower semi-transmissive layer is provided on the major surface. The upper semi-transmissive layer is provided on the lower semi-transmissive layer. The base body, the lower and upper semi-transmissive layers form a first region to selectively transmit blue light, a second region to selectively transmit green light, and a third region to selectively transmit red light, arranged in a plane parallel to the major surface. A distance between the lower semi-transmissive layer and the upper semi-transmissive layer in the second region is shorter than a distance between the lower semi-transmissive layer and the upper semi-transmissive layer in the first region, and shorter than a distance between the lower semi-transmissive layer and the upper semi-transmissive layer in the third region.

17 Claims, 14 Drawing Sheets

(56) References Cited

OTHER PUBLICATIONS

U.S. Appl. No. 13/718,601, filed Dec. 18, 2012, Nagato, et al.
U.S. Appl. No. 13/554,339, filed Jul. 20, 2012, Nakai, et al.
U.S. Appl. No. 14/022,686, filed Sep. 10, 2013, Nagato, et al.
Office Action issued Mar. 31, 2014, in Taiwan Patent Application No. 101122073. (with English-language translation).
Office Action issued May 20, 2014, in Korean Patent Application No. 10-2012-71017, with English Translation.

μ=134nm

μ=107nm

μ=84nm

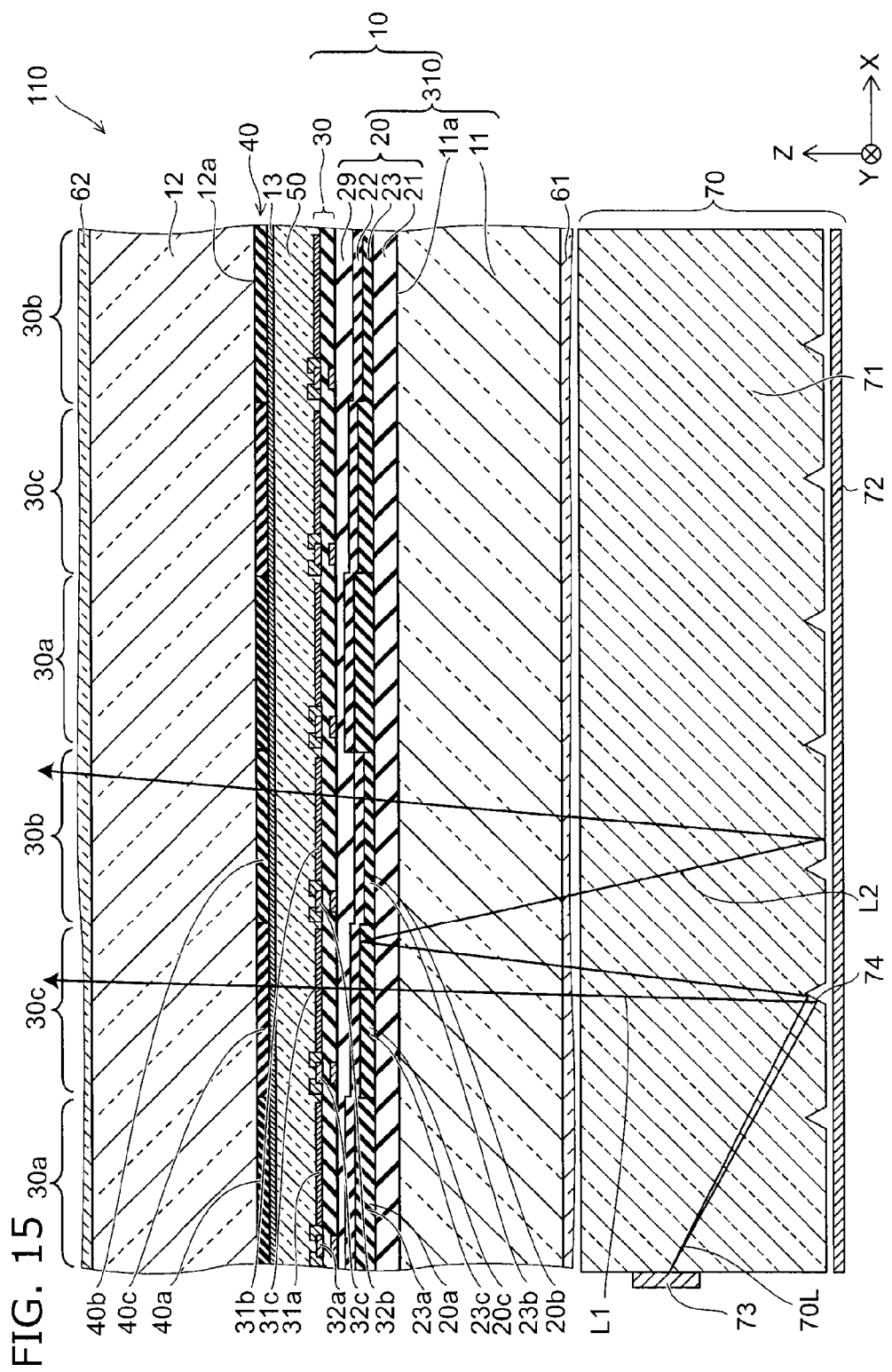

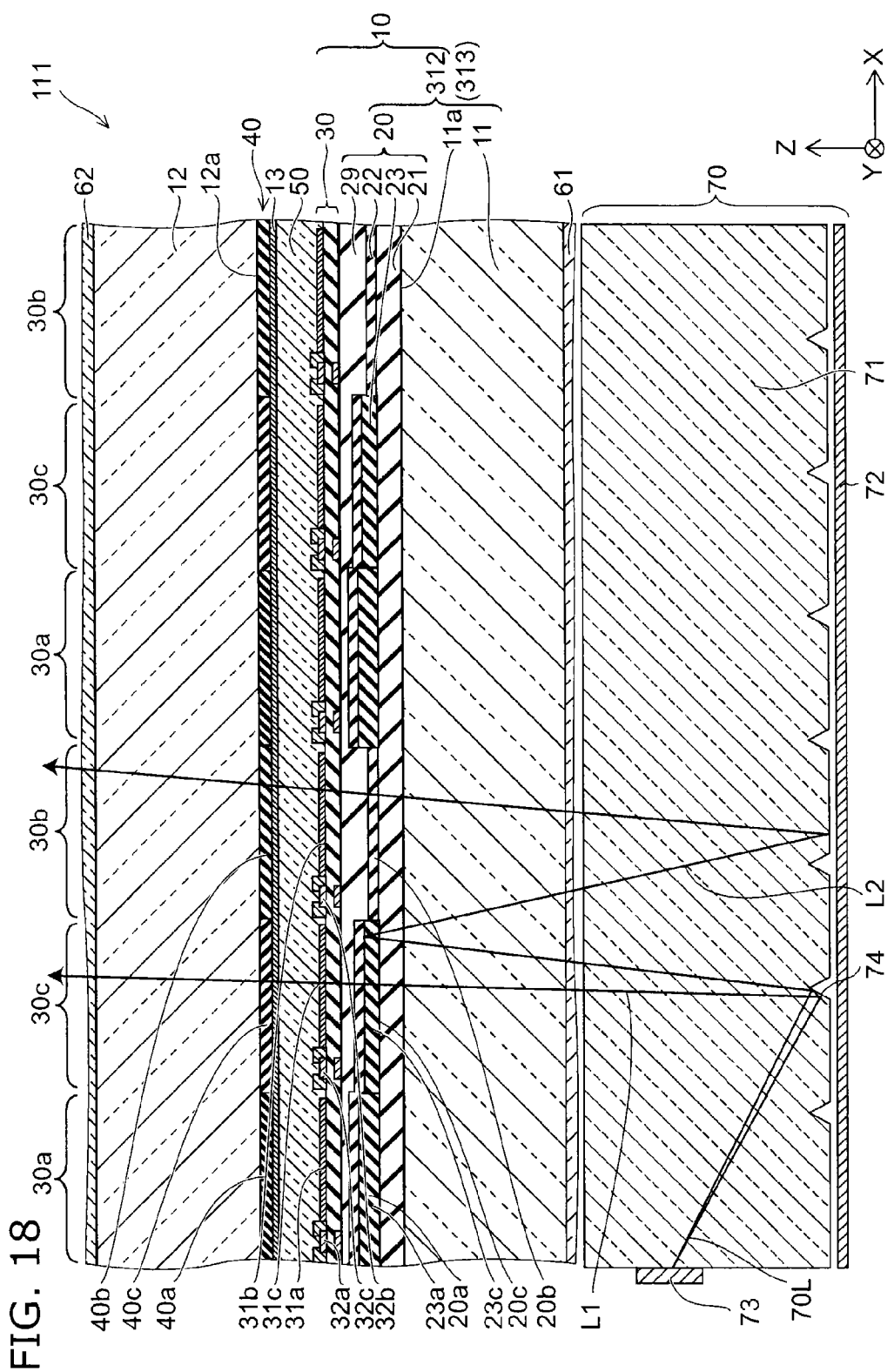

US 8,810,754 B2

INTERFERENCE FILTER AND DISPLAY DEVICE

CROSS-REFERENCE TO RELATED APPLICATIONS

This application is based upon and claims the benefit of priority from the prior Japanese Patent Application No. 2011-212040, filed on Sep. 28, 2011; the entire contents of which are incorporated herein by reference.

FIELD

Embodiments described herein relate generally to an interference filter and a display device.

BACKGROUND

In display devices such as liquid crystal display devices, there is demand for lower power consumption. A practical color filter with increased light utilization efficiency and stable characteristic is desired.

BRIEF DESCRIPTION OF THE DRAWINGS

FIG. 15 is a schematic sectional view showing a display device according to a second embodiment;

FIG. 18 is a schematic sectional view showing a display device according to the second embodiment.

DETAILED DESCRIPTION

Figure 1:
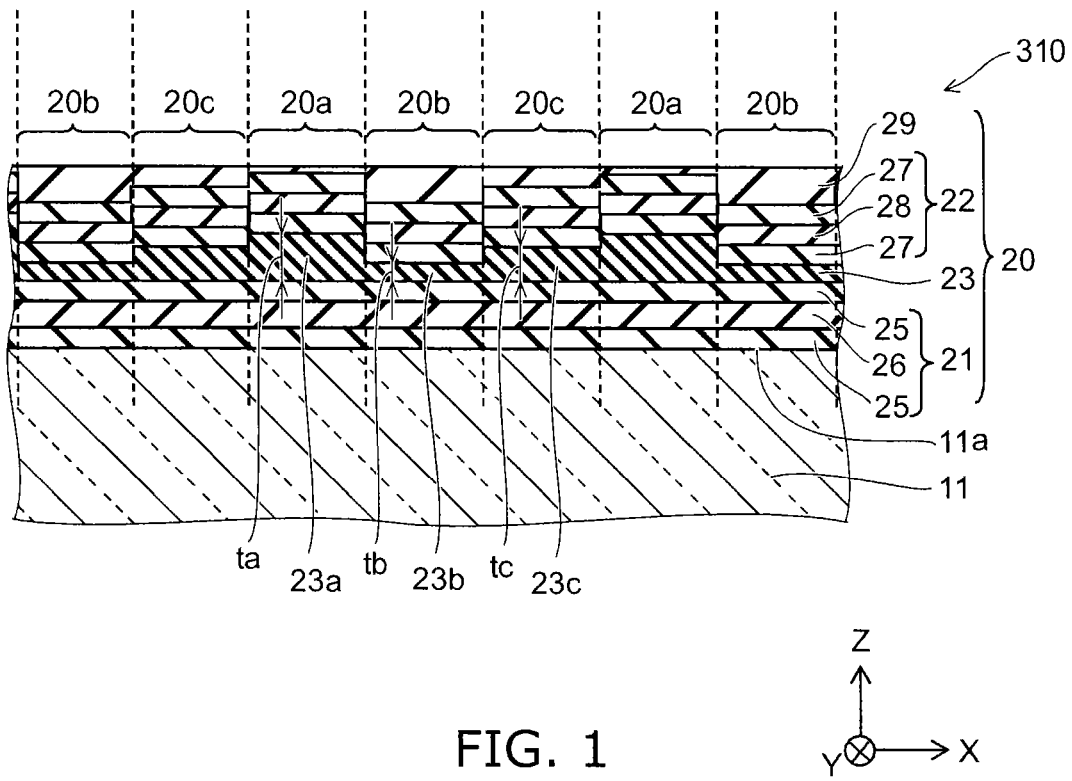
FIG. 1 is a schematic sectional view showing an interference filter according to a first embodiment.

According to one embodiment, an interference filter includes a base body, a lower semi-transmissive layer, and an upper semi-transmissive layer. The base body includes a major surface. The lower semi-transmissive layer is provided on the major surface. The upper semi-transmissive layer is provided on the lower semi-transmissive layer. The base body, the lower semi-transmissive layer and the upper semi-transmissive layer form a first region to selectively transmit blue light, a second region to selectively transmit green light, and a third region to selectively transmit red light. The first region, the second region and the third region are arranged in a plane parallel to the major surface. A distance between the lower semi-transmissive layer and the upper semi-transmissive layer in the second region is shorter than a distance between the lower semi-transmissive layer and the upper semi-transmissive layer in the first region, and shorter than a distance between the lower semi-transmissive layer and the upper semi-transmissive layer in the third region.

According to another embodiment, a display device includes an interference filter, a wavelength selective absorption layer, and a light control layer. The interference filter includes a base body including a major surface, a lower semi-transmissive layer provided on the major surface, and an upper semi-transmissive layer provided on the lower semi-transmissive layer. The base body, the lower semi-transmissive layer and the upper semi-transmissive layer form a first region to selectively transmit blue light, a second region to selectively transmit green light, and a third region to selectively transmit red light. The first region, the second region and the third region are arranged in a plane parallel to the major surface. A distance between the lower semi-transmissive layer and the upper semi-transmissive layer in the second region is shorter than a distance between the lower semi-transmissive layer and the upper semi-transmissive layer in the first region, and shorter than a distance between the lower semi-transmissive layer and the upper semi-transmissive layer in the third region. The wavelength selective absorption layer is stacked with the base body. The light control layer is stacked with the base body. The wavelength selective absorption layer includes a blue first absorption layer including a portion overlapping the first region as viewed along a first direction perpendicular to the major surface, a green second absorption layer including a portion overlapping the second region as viewed along the first direction, and a red third absorption layer including a portion overlapping the third region as viewed along the first direction. The light control layer controls an intensity of a light passing through each of the first region, the second region and the third region.

Various embodiments will be described hereinafter with reference to the accompanying drawings.

The drawings are schematic or conceptual. The size ratio between the portions, for instance, is not necessarily identical to that in reality. Furthermore, the same portion may be shown with different dimensions or ratios depending on the figures.

In the present specification and the drawings, components similar to those described previously with reference to earlier figures are labeled with like reference numerals, and the detailed description thereof is omitted appropriately.

(First Embodiment)

FIG. 1 is a schematic sectional view illustrating the configuration of an interference filter according to a first embodiment.

As shown in FIG. 1, the interference filter 310 according to the embodiment includes a base body 11, a lower semi-transmissive layer 21, and an upper semi-transmissive layer 22.

The base body 11 includes a major surface 11a. The base body 11 is made of e.g. glass or resin. The base body 11 is e.g. optically transmissive.

The lower semi-transmissive layer 21 is provided on the major surface 11a. The upper semi-transmissive layer 22 is provided on the lower semi-transmissive layer 21. The lower semi-transmissive layer 21 and the upper semi-transmissive layer 22 have transmissivity and reflectivity to light.

In the description, the state of being provided on an element includes not only the state of being placed thereon in contact, but also the state of being placed thereon with another element interposed in between.

The base body 11, the lower semi-transmissive layer 21, and the upper semi-transmissive layer 22 are mutually stacked.

In the description, the state of being stacked includes not only the state of being directly stacked, but also the state of being stacked with another element interposed in between.

Here, the direction perpendicular to the major surface 11a is defined as Z-axis direction (first direction). One axis perpendicular to the Z-axis direction is defined as X-axis direction (second direction). The axis perpendicular to the Z-axis direction and the X-axis direction is defined as Y-axis direction.

The interference filter 310 includes a plurality of regions. Specifically, the interference filter 310 (major surface 11a) includes a first region 20a, a second region 20b, and a third region 20c. The first region 20a, the second region 20b, and the third region 20c are arranged in the X-Y plane. The first region 20a, the second region 20b, and the third region 20c are mutually juxtaposed in the X-Y plane. Furthermore, the first region 20a, the second region 20b, and the third region 20c are each provided in a plurality in the X-Y plane.

The first region 20a is e.g. a blue light transmitting region. The second region 20b is e.g. a green light transmitting region. The third region 20c is e.g. a red light transmitting region.

That is, the interference filter 310 includes a first region 20a for selectively transmitting blue light, a second region 20b for selectively transmitting green light, and a third region 20c for selectively transmitting red light, juxtaposed in a plane (X-Y plane) parallel to the major surface 11a. In other words, the base body 11, the lower semi-transmissive layer 21, and the upper semi-transmissive layer 22 form the first region 20a, the second region 20b and the third region 20c The first region 20a, the second region 20b, and the third region 20c are each provided in a plurality. The plurality of first regions 20a, the plurality of second regions 20b, and the plurality of third regions 20c are each periodically and repetitively disposed along at least one direction (e.g., X-axis direction) in the X-Y plane. The plurality of first regions 20a, the plurality of second regions 20b, and the plurality of third regions 20c may be each periodically disposed also along the Y-axis direction. In the embodiment, the order of disposal of the first region 20a, the second region 20b, and the third region 20c is arbitrary.

As shown in FIG. 1, the distance (second distance tb) between the lower semi-transmissive layer 21 and the upper semi-transmissive layer 22 in the second region 20b is shorter than the distance (first distance ta) between the lower semi-transmissive layer 21 and the upper semi-transmissive layer 22 in the first region 20a. The second distance tb is shorter than the distance (third distance tc) between the lower semi-transmissive layer 21 and the upper semi-transmissive layer 22 in the third region 20c. That is, tb (green)<ta (blue), and tb (green)<tc (red).

In this example, the third distance tc is shorter than the first distance ta. That is, tb (green)<tc (red)<ta (blue). However, the embodiment is not limited thereto, but the relationship between tc (red) and ta (blue) is arbitrary. For instance, it is also possible that tb (green)<ta (blue)<tc (red).

In the interference filter 310, for instance, by interference between the lower semi-transmissive layer 21 and the upper semi-transmissive layer 22, light having a specific wavelength is selectively transmitted, and light having a wavelength other than the specific wavelength is reflected. The interference filter 310 is e.g. an interference filter of the Fabry-Perot type.

In the interference filter 310, the aforementioned selection wavelength is based on the optical distance between the lower semi-transmissive layer 21 and the upper semi-transmissive layer 22. For instance, if the medium provided between the lower semi-transmissive layer 21 and the upper semi-transmissive layer 22 is the same, the selection wavelength is changed based on the distance between the lower semi-transmissive layer 21 and the upper semi-transmissive layer 22.

As shown in FIG. 1, the interference filter 310 further includes an intermediate layer 23. The thickness of the intermediate layer 23 is different for each region.

That is, the interference filter 310 can further include e.g. a first spacer layer 23a and a third spacer layer 23c. The first spacer layer 23a is provided between the lower semi-transmissive layer 21 and the upper semi-transmissive layer 22 in the first region 20a. The third spacer layer 23c is provided between the lower semi-transmissive layer 21 and the upper semi-transmissive layer 22 in the third region 20c.

The interference filter 310 may further include a second spacer layer 23b. The second spacer layer 23b is provided between the lower semi-transmissive layer 21 and the upper semi-transmissive layer 22 in the second region 20b. However, in the embodiment, the second spacer layer 23b may be omitted. For instance, as described later, the second distance tb may be 0 (zero).

The first spacer layer 23a and the third spacer layer 23c are included in the intermediate layer 23. In the case where the second spacer layer 23b is provided, the second spacer layer 23b is included in the intermediate layer 23. The first spacer layer 23a, the second spacer layer 23b, and the third spacer layer 23c may be either mutually continuous or mutually independent.

In the case where the second spacer layer 23b is provided, the thickness of the second spacer layer 23b (equal to the second distance tb) is thinner than the thickness of the first spacer layer 23a (equal to the first distance ta). The thickness of the second spacer layer 23b is thinner than the thickness of the third spacer layer 23c (equal to the third distance tc).

Thus, an interference filter with stable characteristic can be provided.

The characteristic of the interference filter 310 will be described later.

Thus, the interference filter 310 according to the embodiment includes a base body 11 and a wavelength selective transmission layer 20 provided on the major surface 11a of the base body 11. The wavelength selective transmission layer 20 includes a lower semi-transmissive layer 21, an upper semi-transmissive layer 22, and an intermediate layer 23.

The portion of the wavelength selective transmission layer 20 corresponding to the first region 20a is referred to as a blue transmission filter for convenience. The portion of the wavelength selective transmission layer 20 corresponding to the second region 20b is referred to as a green transmission filter for convenience. The portion of the wavelength selective transmission layer 20 corresponding to the third region 20c is referred to as a red transmission filter for convenience.

As shown in FIG. 1, in the interference filter 310, the lower semi-transmissive layer 21 includes a first dielectric film 25 and a second dielectric film 26. The second dielectric film 26 is stacked with the first dielectric film 25 (along the Z-axis direction). The refractive index of the second dielectric film 26 is different from the refractive index of the first dielectric film 25. In the following description, it is assumed that the refractive index of the second dielectric film 26 is lower than the refractive index of the first dielectric film 25.

The upper semi-transmissive layer 22 includes a third dielectric film 27 and a fourth dielectric film 28. The fourth dielectric film 28 is stacked with the third dielectric film 27 (along the Z-axis direction). The refractive index of the fourth dielectric film 28 is different from the refractive index of the third dielectric film 27. In the following description, it is assumed that the refractive index of the fourth dielectric film 28 is lower than the refractive index of the third dielectric film 27.

In the example shown in FIG. 1, the refractive index of the intermediate layer 23 is lower than the refractive index of the first dielectric film 25 (high refractive index film) and the third dielectric film 27 (high refractive index film).

At a wavelength of 550 nanometers (nm), the refractive index of the first dielectric film 25 (high refractive index film) and the third dielectric film 27 (high refractive index film) is e.g. approximately 2.5. The first dielectric film 25 and the third dielectric film 27 are made of e.g. $TiO_2$.

At a wavelength of 550 nm, the refractive index of the second dielectric film 26 (low refractive index film) and the fourth dielectric film 28 (low refractive index film) is e.g. approximately 1.46. The second dielectric film 26 and the fourth dielectric film 28 are made of e.g. $SiO_2$.

Thus, in the interference filter 310, thin layers of dielectrics having different refractive indices are stacked. As described later, the interference filter 310 can function as a light recycling layer.

Thus, the interference filter 310 includes at least two common semi-transmissive layers (lower semi-transmissive layer 21 and upper semi-transmissive layer 22) including a dielectric stacked film (dielectric multilayer film), and an intermediate layer 23 provided between these semi-transmissive layers. By changing the thickness of the intermediate layer 23, the transmitted color of the interference filter 310 is changed to three colors of red, green, and blue. The thickness of the intermediate layer 23 has the relation of green spacer layer thickness (corresponding to the second distance tb)<red spacer layer thickness (corresponding to the third distance tc)<blue spacer layer thickness (corresponding to the first distance ta).

In the interference filter 310, the configuration of the interference filter of the Fabry-Perot type is used. Thus, in each of the color filters (first to third regions 20a-20c), the rest of the transmitted color is reflected without substantial loss. For instance, the red component in white light can be transmitted through the red transmission filter (third region 20c) of the interference filter. On the other hand, light having blue and green wavelength components is not transmitted through the third region 20c but reflected.

For instance, the reflected green light is multiply reflected between the interference filter 310 and e.g. a reflection layer combined with the interference filter 310. Upon reaching the green transmission filter (second region 20b), the green light is emitted out from the second region 20b.

Green light and blue light incident to the red transmission filter (third region 20c) are multiply reflected between the interference filter 310 and the reflection layer and emitted out from the second region 20b and the first region 20a, respectively.

In an absorption type color filter, blue light and green light incident to the red absorption layer are absorbed and lost in the red absorption layer. By combining the absorption type filter with the interference filter 310, light is recycled and efficiently used. For instance, in the absorption type color filter, ⅔ of light is lost. In contrast, the absorption type filter and the interference filter 310 can be disposed so that light passes through the interference filter 310 before incidence to the absorption type filter. This can realize a substantially lossless condition. Thus, the efficiency of substantially three times the efficiency in the absorption type filter can be achieved.

As shown in FIG. 1, the interference filter 310 can further include an overcoat layer 29 provided on the upper semi-transmissive layer 22. By providing the overcoat layer 29, for instance, the flatness of the upper surface of the interference filter 310 is improved. Here, the overcoat layer 29 is provided as necessary, and can be omitted as the case may be. By providing the overcoat layer 29, various devices can be formed more easily on the upper surface of the interference filter 310.

In the example shown in FIG. 1, two first dielectric films 25 are provided, and one second dielectric film 26 is provided between the two first dielectric films 25. However, in the embodiment, the number of first dielectric films 25 and second dielectric films 26 is arbitrary. For instance, a plurality of first dielectric films 25 and a plurality of second dielectric films 26 may be provided and mutually stacked. Alternatively, one first dielectric film 25 and one second dielectric film 26 may be provided.

Furthermore, in this example, two third dielectric films 27 are provided, and one fourth dielectric film 28 is provided between the two third dielectric films 27. However, in the embodiment, the number of third dielectric films 27 and fourth dielectric films 28 is arbitrary. For instance, a plurality of third dielectric films 27 and a plurality of fourth dielectric films 28 may be provided and mutually stacked. Alternatively, one third dielectric film 27 and one fourth dielectric film 28 may be provided.

In the following, an example characteristic of the interference filter is described.

Figure 2:
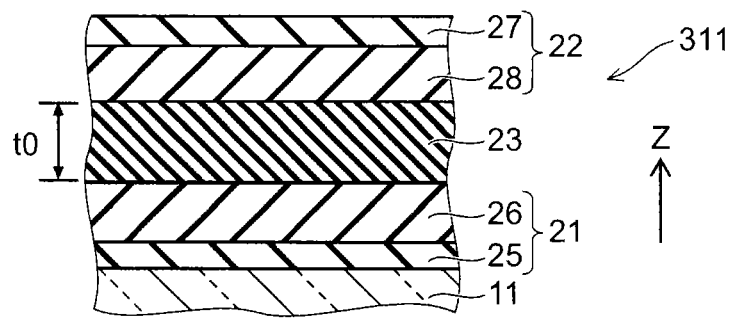
FIG. 2 is a schematic sectional view showing an interference filter according to the first embodiment.

FIG. 2 is a schematic sectional view illustrating the configuration of an interference filter according to the first embodiment.

As shown in FIG. 2, in the interference filter 311 according to the embodiment, the lower semi-transmissive layer 21 includes one first dielectric film 25 and one second dielectric film 26. Furthermore, the upper semi-transmissive layer 22 includes one third dielectric film 27 and one fourth dielectric film 28. Between the lower semi-transmissive layer 21 and the upper semi-transmissive layer 22, an intermediate layer 23 is provided. In this example, the intermediate layer 23 is provided between the first dielectric film 25 and the third dielectric film 27. The second dielectric film 26 is provided between the first dielectric film 25 and the intermediate layer 23. The fourth dielectric film 28 is provided between the third dielectric film 27 and the intermediate layer 23.

The refractive index (wavelength 550 nm) of the first dielectric film 25 and the third dielectric film 27 is e.g. 2.5. The thickness (length along the Z axis) of the first dielectric film 25 and the third dielectric film 27 is e.g. 53.5 nm. The refractive index (wavelength 550 nm) of the second dielectric film 26 and the fourth dielectric film 28 is e.g. 1.46. The thickness of the second dielectric film 26 and the fourth dielectric film 28 is e.g. 91.6 nm.

The thicknesses of these layers are adjusted so as to be equal to e.g. the optical distance of a quarter wavelength of the green dominant wavelength in NTSC, 535 nm.

The refractive index of the intermediate layer 23 is e.g. 2.5. By changing the thickness t0 of the intermediate layer 23, the optical characteristic of the interference filter 311 is changed.

Figure 3:
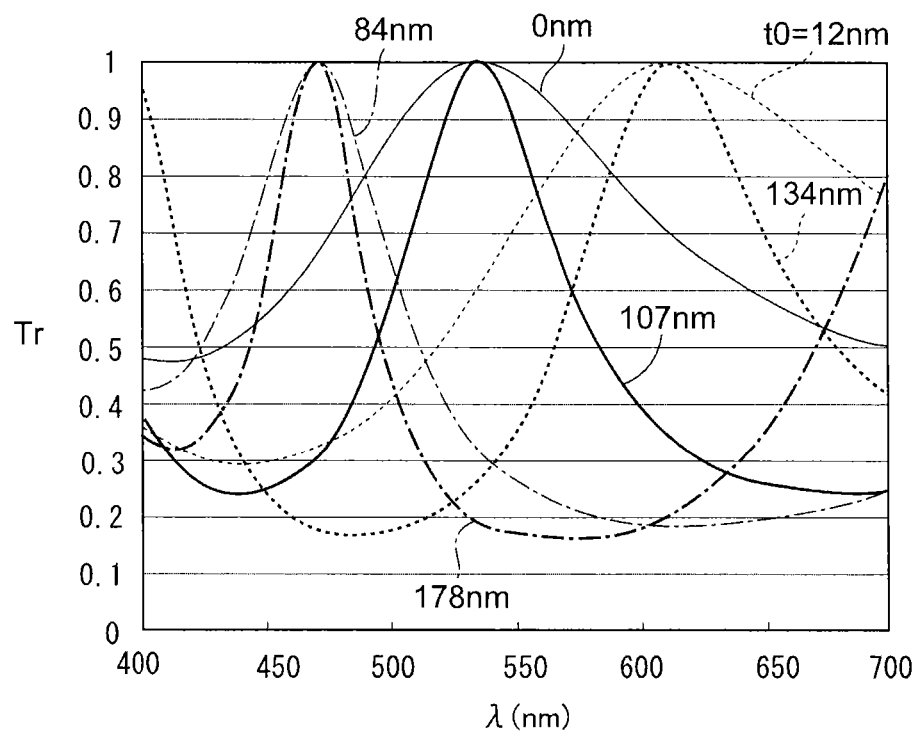
FIG. 3 is a graph showing the characteristic of the interference filter according to the first embodiment.

FIG. 3 is a graph illustrating the characteristic of the interference filter according to the first embodiment.

The horizontal axis represents wavelength $\lambda$ (nm). The vertical axis represents the transmittance Tr of the interference filter 311. This graph shows the wavelength dependence of the transmittance Tr when the thickness t0 of the intermediate layer is 0 nm, 12 nm, 84 nm, 107 nm, 134 nm, and 178 nm. The numerical values in the graph indicate the thickness t0 of the intermediate layer.

When the thickness t0 of the intermediate layer 23 is 0 nm or 107 nm, the interference filter 311 transmits green light. When the thickness t0 is 12 nm or 134 nm, the interference filter 311 transmits red light. When the thickness t0 is 84 nm or 178 nm, the interference filter 311 transmits blue light.

Thus, the transmitted wavelength is changed with the thickness t0 of the intermediate layer 23. Here, in actually manufacturing the interference filter 311, the thickness t0 of the intermediate layer 23 is changed due to manufacturing variations. If the thickness t0 is excessively varied, the characteristic of the interference filter 311 deviates from the desired characteristic. The present inventors have focused on this problem occurring in the practical application of the interference filter 311.

In the following, an example relationship between the change of the thickness of the intermediate layer 23 and the change of the optical characteristic is described.

Figure 4:
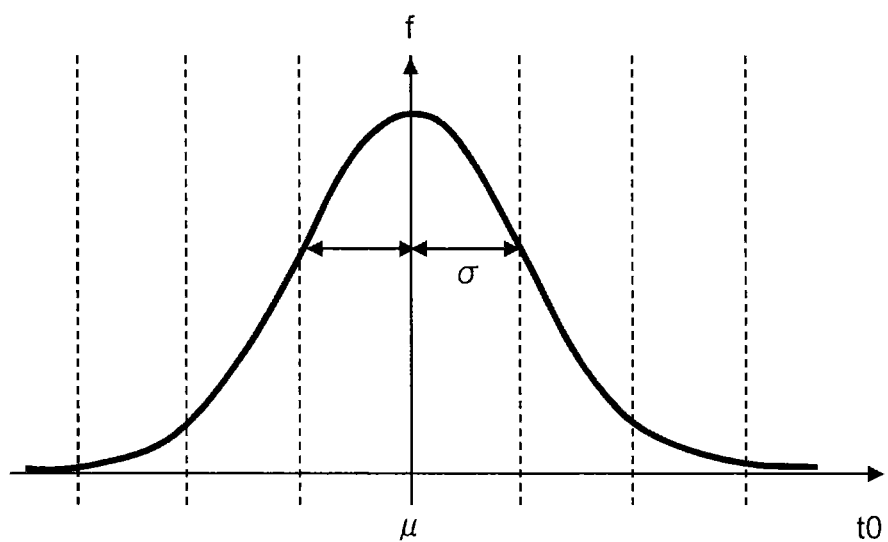
FIG. 4 is a graph showing the distribution of the film thickness using for calculation.

FIG. 4 shows an example variation in the thickness of the intermediate layer 23. The horizontal axis represents the thickness t0 of the intermediate layer 23. The vertical axis represents the probability density f.

As shown in FIG. 4, the thickness t0 of the intermediate layer 23 is e.g. normally distributed around a central value $\mu$ with a standard deviation $\sigma$.

In the following, based on the assumption of this normal distribution, an example result of calculating the characteristic of the interference filter 311 is described. In this calculation, it is assumed that due to manufacturing variations, the thickness t0 is normally distributed with the standard deviation $\sigma$ being 10% of the central value $\mu$. This assumption corresponds to the in-plane variation of the thickness t0 in the case of forming the intermediate layer 23 by e.g. CVD (chemical vapor deposition).

Figure 5A:
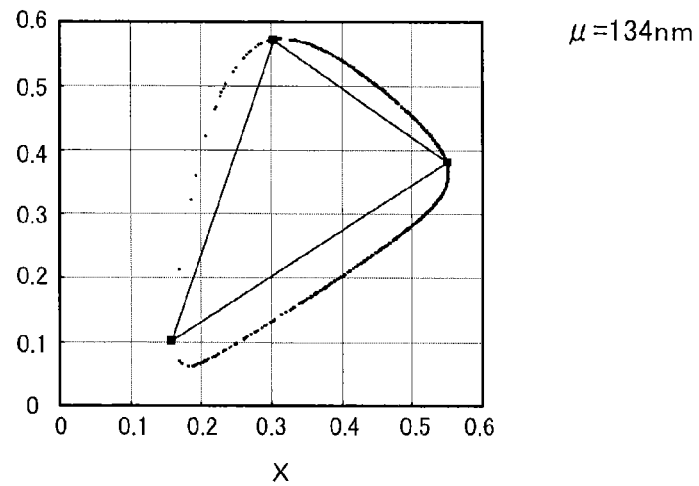
FIG. 5A to FIG. 5C are graphs showing the characteristic of the interference filter.
Figure 5B:
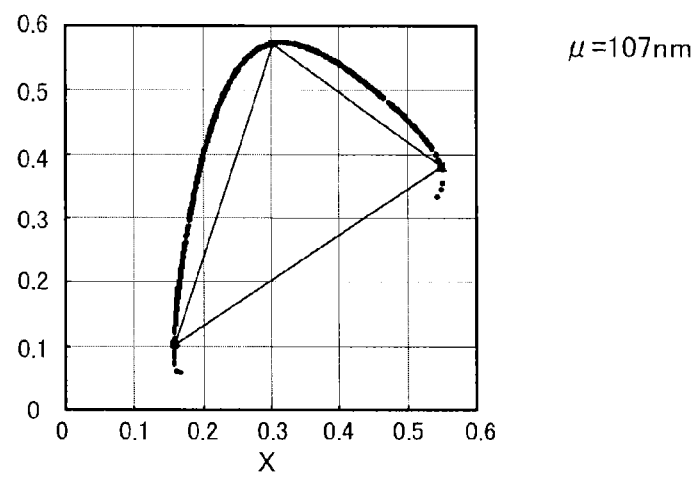
Figure 5C:
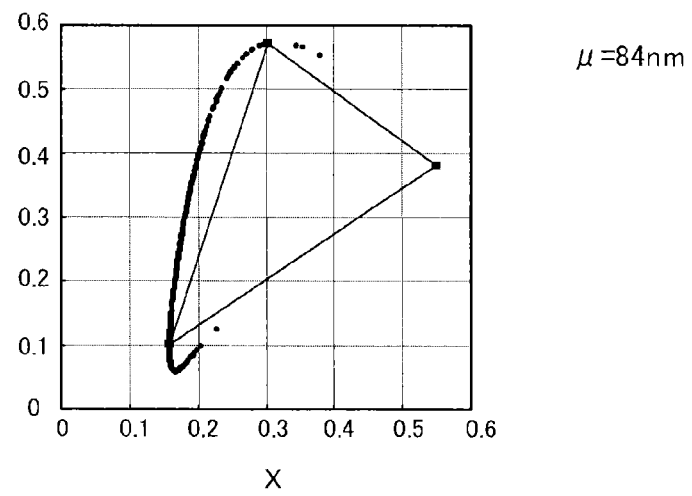

FIG. 5A to FIG. 5C are graphs illustrating the characteristic of the interference filter.

FIG. 5A, FIG. 5B, and FIG. 5C correspond to the case where the central value $\mu$ ($\mu$m) of the thickness t0 of the intermediate layer 23 is 134 nm (red), 107 nm (green), and 84 nm (blue), respectively. These figures are CIE chromaticity diagrams showing the color of the transmitted light when the thickness t0 is changed in the range of central value $\mu \pm \sigma$ (10%).

As shown in FIG. 5A to FIG. 5C, if the thickness t0 is changed by ±10%, the color is changed very significantly. For instance, red and green are changed over all colors in the presence of the distribution of ±10%. That is, by the change of the thickness t0 to this extent, the characteristic of the interference filter is turned to an undesired characteristic.

In FIGS. 5A to 5C, the change of the thickness t0 of the intermediate layer 23 is illustrated. However, actually, the change of the optical characteristic due to variation in the thickness of the lower semi-transmissive layer 21 and the upper semi-transmissive layer 22 is also conceived. However, as a result of calculation, it has turned out that the influence of variation in the thickness of the intermediate layer 23 is much greater than the influence of variation in the thickness of the lower semi-transmissive layer 21 and the upper semi-transmissive layer 22.

In order to obtain a color filter with stable characteristic, the present inventors have investigated a configuration in which the change of the optical characteristic is made small when the thickness t0 of the intermediate layer 23 is changed.

The green transmission filter has a transmission spectrum with a peak of transmitted light at approximately 535 nm. In the red and blue transmission spectra, the peak occurs on the long wavelength side or short wavelength side. In contrast, the green transmission filter has a peak in the portion with high visibility.

For instance, in the blue transmission filter, if the thickness t0 is thinned, the transmission peak is shifted to the short wavelength. In this case, the chromaticity remains around blue on the chromaticity diagram. That is, in the blue transmission filter, the change of color is small in the case where the thickness t0 is thinned.

For instance, in the red transmission filter, if the thickness t0 is thickened, the color is not significantly changed from red. However, in the case of t0=134 nm shown in FIG. 5A, the transmittance on the short wavelength side (approximately 400 nm) is high. By the thickening of the thickness t0, this portion is shifted to the blue side. Thus, the change to the blue side also occurs.

In contrast, the green transmission filter has a peak in the portion with high visibility. The peak is shifted with the change of the thickness t0. Thus, the change of color is large.

Here, the intermediate layer 23 in the green transmission filter can be set thin. This can suppress the change of color due to variation in the thickness t0 of the intermediate layer 23. In the embodiment, for instance, the intermediate layer 23 is not provided in the green transmission filter. That is, t0=0 nm in the green transmission filter. Thus, the change of color due to variation in the thickness t0 of the intermediate layer 23 does not occur.

Figure 6:
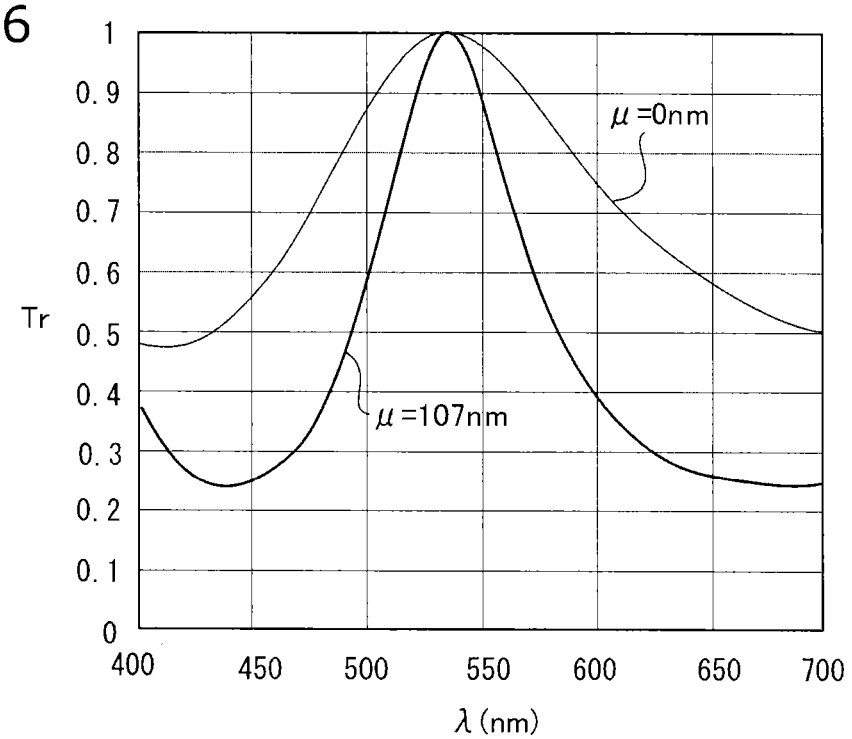
FIG. 6 is a graph showing the characteristic of the interference filter.

FIG. 6 is a graph illustrating the characteristic of the interference filter.

As shown in FIG. 6, when the central value $\mu$ of the thickness t0 of the intermediate layer 23 is 0 nm and 107 nm, the transmission characteristic of the green color is obtained. That is, a peak of transmittance Tr occurs at a wavelength $\lambda$ of approximately 535 nm.

Figure 7:
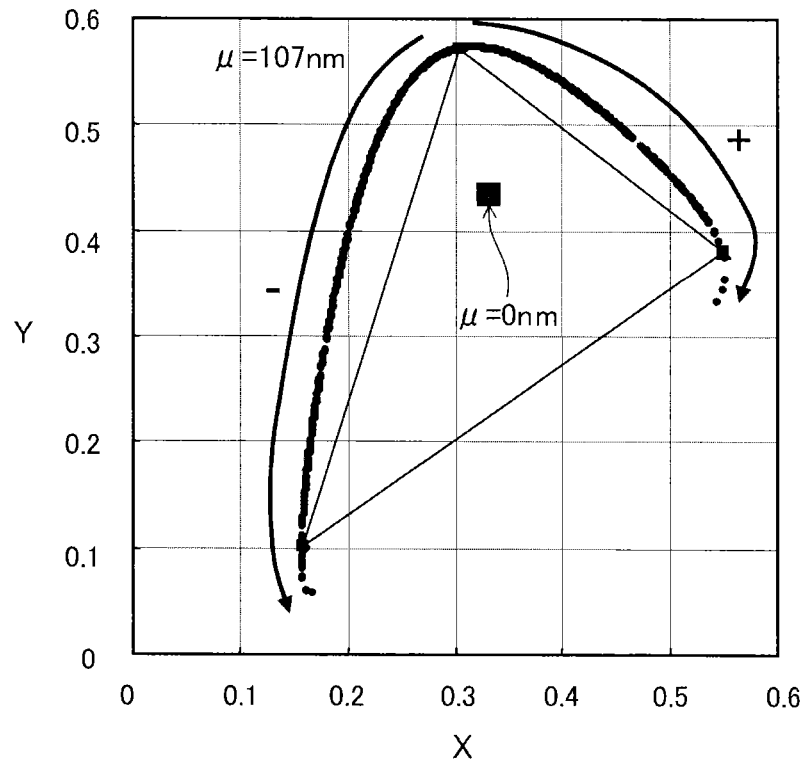
FIG. 7 is a graph showing the characteristic of the interference filter.

FIG. 7 is a graph illustrating the characteristic of the interference filter.

This figure is a chromaticity diagram illustrating the change of color associated with the change of the thickness t0 by ±10% when the central value $\mu$ is 0 nm and 107 nm. When the central value $\mu$ is 107 nm, if the thickness t0 is changed by ±10%, the color is significantly changed. The color is changed in a wide range from red to blue.

In contrast, when the central value $\mu$ is 0 nm, the change of the thickness t0 due to manufacturing variations does not occur, either. Thus, there is no change of color.

In the embodiment, the thickness t0 of the intermediate layer 23 in the green transmission filter is set thinner than the thickness t0 in the red transmission filter and the blue transmission filter. Specifically, for instance, the intermediate layer 23 is not provided in the green transmission filter. Thus, color change in the green transmission filter can be suppressed.

As seen from FIG. 6, the transmittance Tr in the wavelength region except green for t0=0 nm is higher than that for t0=107 nm. Thus, the color gamut for t0=0 nm is smaller than the color gamut for t0=107 nm. However, the configuration with no intermediate layer 23 has high robustness to the variation of the thickness t0.

Figure 8A:
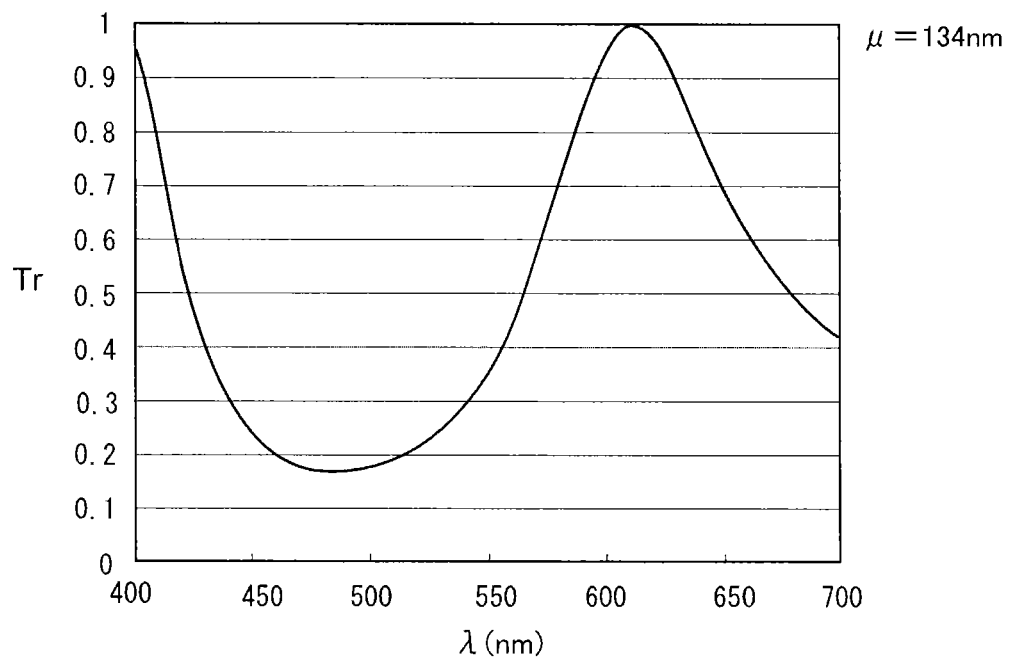
FIG. 8A and FIG. 8B are graphs showing the characteristic of the interference filter.
Figure 8B:
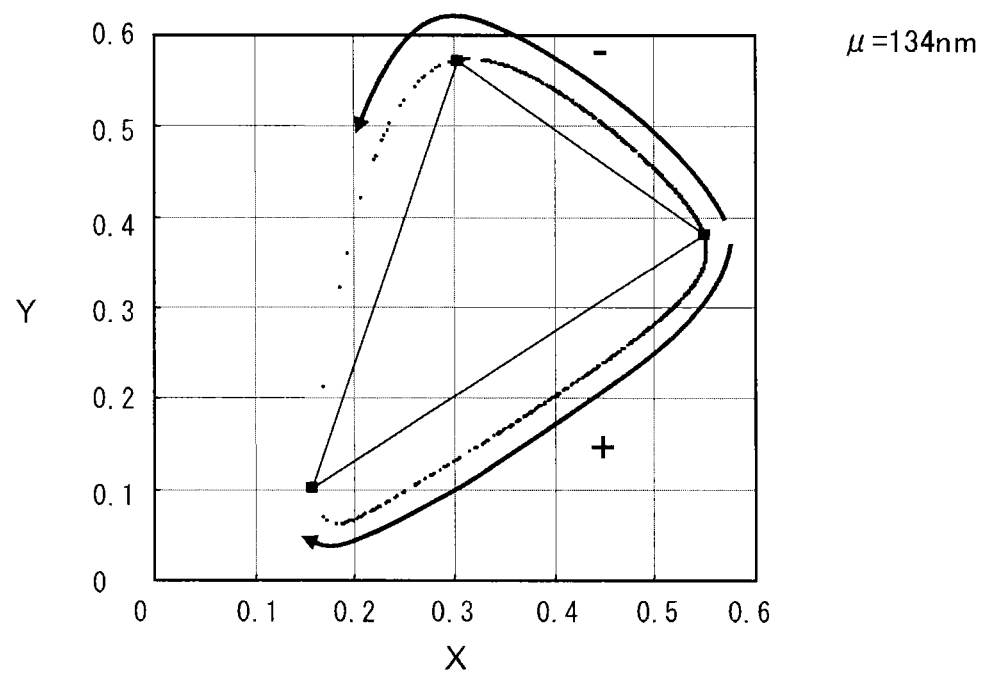

FIG. 8A and FIG. 8B are graphs illustrating the characteristic of the interference filter.

FIG. 8A illustrates the wavelength dependence of the transmittance Tr when the central value μ of the thickness t0 of the intermediate layer 23 is 134 nm (red). The characteristic shown in this figure is the same as the characteristic illustrated in FIG. 3. FIG. 8B is a chromaticity diagram illustrating the change of color when the central value μ is 134 nm and the thickness t0 is changed by ±10%.

As shown in FIG. 8A, when the central value μ is 134 nm, a good red transmission spectrum is obtained.

As shown in FIG. 8B, in the case where the thickness t0 of the intermediate layer 23 is made thin (minus, denoted by −), the color change occurs to the green region. On the other hand, in the case where the thickness t0 is made thicker than 134 nm (plus, denoted by +), the color change occurs to the blue region. This is attributed to the transmittance Tr on the short wavelength side (approximately 400 nm) being high as shown in FIG. 8A. By the thickening of the thickness t0, this portion is shifted to the blue side. Thus, in the case where the thickness t0 is 134 nm, blue light is transmitted due to the variation of the thickness t0. This turns the color blue.

Figure 9A:
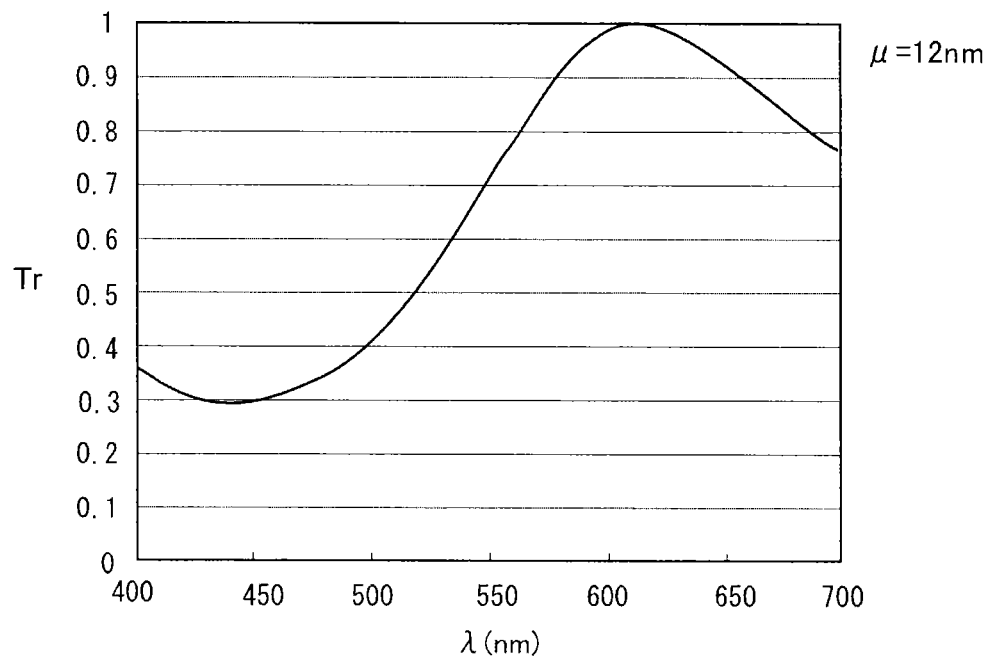
FIG. 9A and FIG. 9B are graphs showing the characteristic of the interference filter.
Figure 9B:
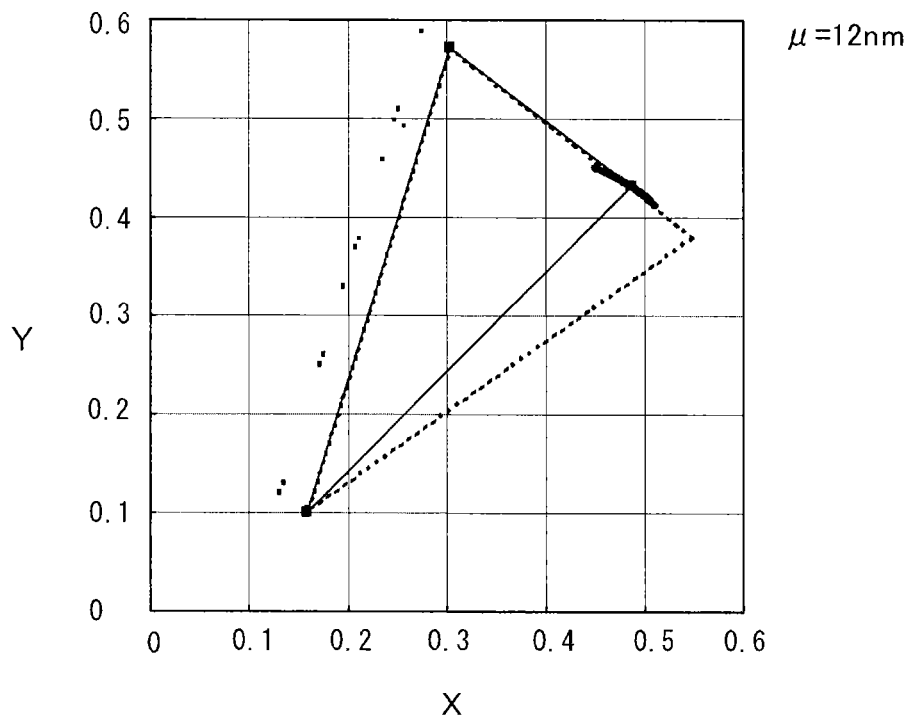

FIG. 9A and FIG. 9B are graphs illustrating the characteristic of the interference filter.

FIG. 9A illustrates the wavelength dependence of the transmittance Tr when the central value μ of the thickness t0 of the intermediate layer 23 is 12 nm (red). The characteristic shown in this figure is the same as the characteristic illustrated in FIG. 3. FIG. 9B is a chromaticity diagram illustrating the change of color when the central value μ is 12 nm and the thickness t0 is changed by ±10%.

As shown in FIG. 9A, when the central value μ is 12 nm, a red transmission spectrum is obtained.

As shown in FIG. 9B, even if the thickness t0 of the intermediate layer 23 is changed by ±10%, the color change is very small.

In the embodiment, the central value μ of the thickness t0 of the intermediate layer 23 in the red transmission filter is set to 12 nm. In the case of ±10% change, the thickness t0 is 10.8 nm or more and 13.2 nm or less. This can decrease the change of color under the variation of the thickness t0.

In the embodiment, in the green transmission filter, the intermediate layer 23 is not provided. That is, thickness t0=0 nm. In the red transmission filter, the thickness t0 of the intermediate layer 23 is set to 12 nm.

Thus, the thickness t0 of the intermediate layer 23 corresponding to green of 535 nm is 0 nm. The thickness t0 of the intermediate layer 23 corresponding to red of 610 nm is 12 nm. That is, the change of the thickness t0 by 12 nm corresponds to the shift of 75 nm of the center wavelength of the transmitted light.

For instance, in the case where the thickness t0 is thinned by 1.2 nm, i.e., 10% of 12 nm, broadly speaking, red is shifted to the short wavelength side by 10% of the wavelength difference between green and red. In contrast, in the case where the thickness t0 of the intermediate layer 23 in the red transmission filter is set to 134 nm, if it is thinned by 10% (i.e., 13.4 nm), the thickness t0 becomes 120.6 nm. On the other hand, t0 equal to 107 nm corresponds to green. Thus, in the case where the thickness t0 is 134 nm, thinning by 10% corresponds to the shift to shorter wavelengths by approximately ¼ of the difference between green and red.

Hence, in order to decrease the color change, in the red transmission filter, the central value μ of the thickness t0 of the intermediate layer 23 is preferably set to 12 nm.

Figure 10A:
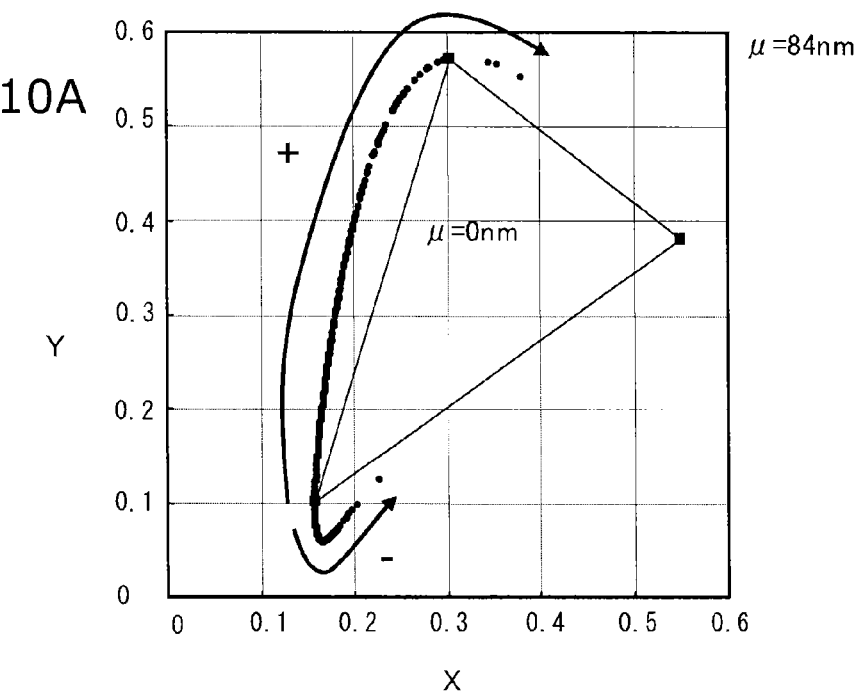
FIG. 10A and FIG. 10B are graphs showing the characteristic of the interference filter.
Figure 10B:
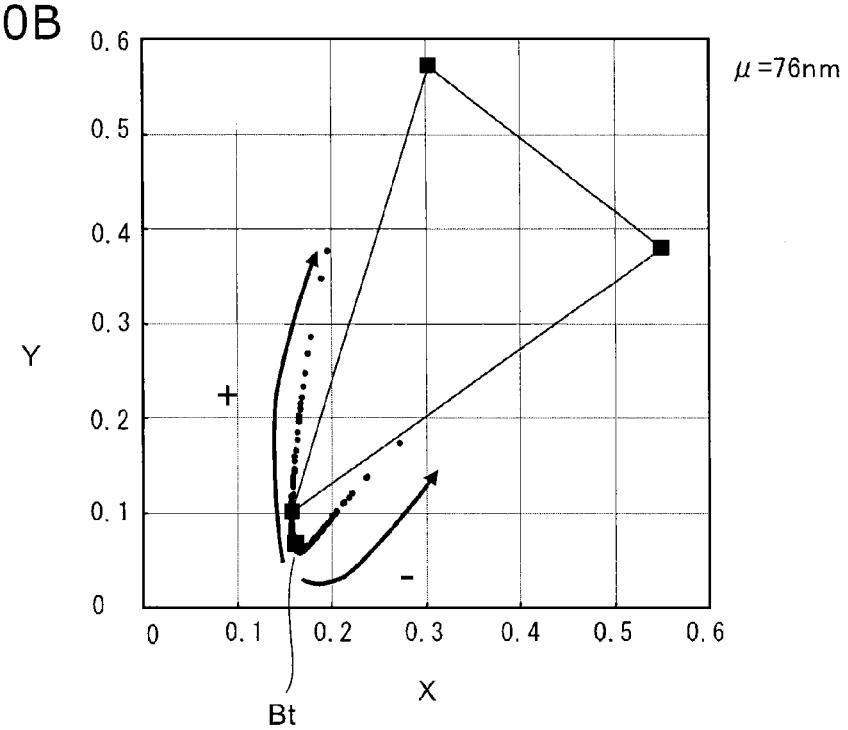

FIG. 10A and FIG. 10B are graphs illustrating the characteristic of the interference filter.

FIG. 10A is a chromaticity diagram illustrating the change of color associated with the change of the thickness t0 by ±10% when the central value μ is 84 nm (blue). FIG. 10B is a chromaticity diagram illustrating the change of color associated with the change of the thickness t0 by ±10% when the central value μ is 76 nm.

As shown in FIG. 10A, when the central value μ is 84 nm (blue), if the thickness t0 is changed by ±10%, the color is significantly changed. Here, it has turned out that the situation of color change is different between when the thickness t0 is shifted to the plus (+) side and when it is shifted to the minus (−) side. That is, in the case where the thickness t0 is shifted to the plus side, the change of color is very large. In contrast, in the case of change to the minus side, the change of color is very small. That is, when the thickness t0 is varied, thinning variation does not cause large color change. The reason for this is considered as follows. In the blue transmission spectrum, even if the thickness t0 is thinned and the transmission peak is shifted to shorter wavelengths, the visibility is low in the blue wavelength region. Thus, it has turned out that, for instance, in the blue transmission filter, the shift to shorter wavelengths is not perceived as large color change.

In the embodiment, the target value of the thickness t0 of the intermediate layer 23 in the blue transmission filter is set smaller than the thickness corresponding to the blue dominant wavelength of NTSC. Specifically, the target value of the thickness t0 of the intermediate layer 23 is preferably set smaller than the thickness corresponding to the blue dominant wavelength, 470 nm. Thus, the color change in the blue transmission filter can be reduced. For instance, the thickness t0 corresponding to the blue of NTSC is 84 nm. The central value μ is set to the value of 90% thereof (76 nm).

As shown in FIG. 10B, when the central value μ of the thickness t0 of the intermediate layer 23 is 76 nm, even if the thickness t0 is changed by ±10%, the change of color is small. Thus, by setting the target thickness t0 of the intermediate layer 23 to be smaller than the thickness corresponding to the blue of NTSC, the color change associated with variation in the thickness t0 of the intermediate layer 23 can be suppressed. That is, the target wavelength value Bt corresponding to the thickness of the intermediate layer 23 in the blue transmission filter is set shorter than the wavelength (470 nm) of the blue of NTSC.

Also in the red transmission filter, the design of shifting the target wavelength value from the red wavelength is conceived. For instance, the target value of the thickness of the intermediate layer 23 in the red transmission filter is shifted to the plus side from the target value of the thickness corresponding to the red of NTSC. Then, it is expected that the color change can be suppressed under the variation of the thickness t0.

However, as illustrated in FIG. 8A and FIG. 8B, in the case where the central value μ of the thickness t0 of the intermediate layer 23 is set around 134 nm, the transmittance Tr is high also in the ultraviolet range. Thus, if the target value of the thickness t0 is shifted to the plus side, the transmittance Tr in the blue region increases. Then, the color deviates from the target red.

In contrast, as illustrated in FIG. 9A and FIG. 9B, in the case where the central value μ of the thickness t0 of the intermediate layer 23 is set around 12 nm, the transmittance Tr in the ultraviolet range is low. Thus, even if the target thickness t0 is set to the plus side, the deviation of color from red is small. However, the effect of suppressing the color change by changing the central value μ of the thickness t0 from 134 nm to 12 nm is greater than the effect of suppressing the color change by shifting the thickness t0 from the target value. Hence, for the red transmission filter, the thickness t0 is preferably set to 12 nm.

For green, which is high in visibility, the change of color is large in both cases where the thickness t0 is changed to the plus side and the minus side.

For the blue transmission filter, an example simulation result of the optical characteristic under the change of the thickness of the spacer layer 23 (first spacer layer 23a) is described. In the following, the target peak wavelength of blue color is set to the standard blue of NTSC, 470 nm (denoted by $\lambda_{bo}$). The optical distance $L_{bo}$ (the product of thickness and refractive index) of the transmission filter having a peak at this wavelength is expressed as $L_{bo}=\lambda_{bo}/4$, which yields 117.5 nm. In this example, the refractive index of the spacer layer 23 at 470 nm is set to 1.40. Here, the thickness of the first spacer layer 23a corresponding to the peak wavelength of 470 nm is 84 nm (=117.5/4). In this simulation, the central value μ of the thickness of the first spacer layer 23a is not only set to 84 nm, but also changed as 92 nm, 76 nm, 67 nm, and 59 nm. For the central value μ, it is assumed that the associated thickness is varied with a standard deviation of ±10%. The chromaticity obtained under such thickness variation is determined. Based on this result, the variation of the color difference ΔE from the chromaticity coordinates (0.14, 0.08) of the blue of NTSC is determined. Thus, for each central value μ, the incidence of falling within the range of the prescribed color difference ΔE is determined. From this result, under variation in each thickness (in this example, a standard deviation of ±10%), the maximum ΔEm of color differences occurring at an incidence of 90% is determined.

Figure 11:
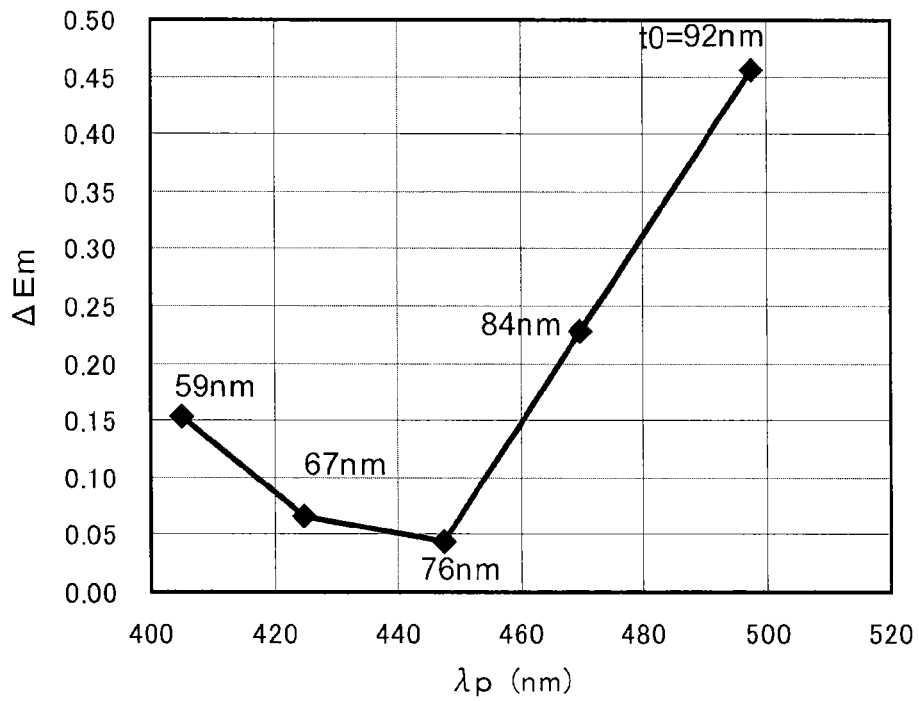
FIG. 11 is a graph showing the characteristic of the interference filter.

FIG. 11 is a graph illustrating the characteristic of the interference filter.

In FIG. 11, the horizontal axis represents the wavelength λp (nm) of the transmission peak at the central value μ of the thickness of the first spacer layer 23a. The vertical axis represents the maximum ΔEm of color differences occurring at 90% incidence under thickness variation around central value μ ±10% standard deviation.

As seen from FIG. 11, in the case where the central value μ of the first spacer layer 23a is 84 nm, the wavelength λp of the transmission peak at the central value μ is 470 nm (as designed). Here, the maximum color difference ΔEm is 0.23. That is, when the central value μ is 84 nm, due to thickness variation, the characteristic at 90% incidence is shifted by a color difference ΔE of 0.23 at the maximum from the chromaticity of the blue of NTSC.

In contrast, in the case where the central value μ of the first spacer layer 23a is 76 nm, the wavelength λp is approximately 450 nm. Here, the maximum color difference ΔEm is approximately 0.05, which is very small. That is, if the central value μ is set to 76 nm, the wavelength λp of the transmission peak is slightly shifted from the target value, 470 nm. However, even under thickness variation, the characteristic at 90% incidence is such that the color difference ΔE from the chromaticity of the blue of NTSC is limited to 0.05.

On the other hand, when the central value μ, of the thickness is 92 nm, the maximum color difference ΔEm is 0.45. Thus, the color variation is made significantly large.

When the central value μ of the thickness is 67 nm, the maximum color difference ΔEm is 0.06. When the central value μ is 59 nm, the maximum color difference ΔEm is 0.15. The increase of the maximum color difference ΔEm for the central value μ smaller than 76 nm is small. However, if the central value μ is made excessively small, the difference between the wavelength λp of the transmission peak and the target of 470 nm is made excessively large.

As described above, when the target wavelength is the blue (470 nm) of NTSC, if there is no thickness variation, the target color characteristics is obtained by setting the central value μ of the thickness to 84 nm. However, as described above, if there is thickness variation, the central value of the thickness is set to 76 nm. Then, a color with small variation in color difference from the blue of NTSC is obtained. Furthermore, a peak wavelength λp (450 nm) close to the wavelength (470 nm) of the blue of NTSC is obtained.

Hence, in view of the practical condition with variation in the thickness of the first spacer layer 23a, the central value of the thickness is shifted from 470 nm to 450 nm. Then, when there is thickness variation, a practical characteristics close to the target color is obtained. Here, in view of the value of 450 nm falling within 90% of 470 nm, the central value μ is preferably set to more than or equal to the value corresponding to the wavelength of 90% of the target wavelength (470 nm).

The foregoing example relates to the case where the refractive index of the spacer layer 23 is 1.40. However, the foregoing investigation result is also applicable to the case of other refractive indices. That is, the central value of the optical distance $L_{bo}$ of the first spacer layer 23a (the product of the first distance tb and the refractive index of the first spacer layer 23a) is set to more than or equal to 90% (i.e., 105.8 nm) of 117.5 nm (i.e., 470 nm/4) and less than 117.5 nm. Thus, when the thickness is varied due to e.g. manufacturing variations, a practical characteristic with small variation is obtained while maintaining an optimal color.

In the embodiment, the product of the first distance ta in the first region 20a and the refractive index of the first spacer layer 23a is set to 105.8 nm or more and less than 117.5 nm. Thus, for instance, in the practical condition with thickness variation, the target blue is easily obtained.

Figure 12:
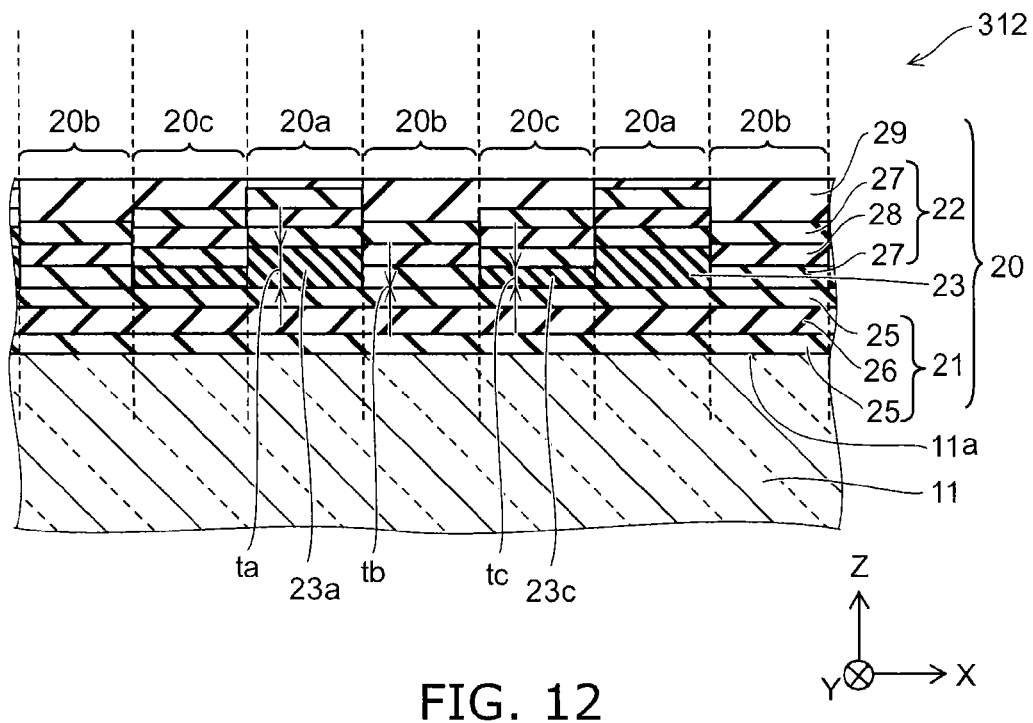
FIG. 12 is a schematic sectional view showing the configuration of an interference filter according to the first embodiment.

FIG. 12 is a schematic sectional view illustrating the configuration of an interference filter according to the first embodiment. As shown in FIG. 12, in the interference filter 312 according to the embodiment, the green transmission filter includes no intermediate layer 23. That is, the thickness t0 of the intermediate layer 23 is set to 0 nm. That is, in the second region 20b, the lower semi-transmissive layer 21 is in contact with the upper semi-transmissive layer 22. In the example shown in FIG. 12, as in FIG. 1, the refractive index of the intermediate layer 23 is lower than the refractive index of the first dielectric film 25 (high refractive index film) and the third dielectric film 27 (high refractive index film).

In the red transmission filter, for instance, the thickness t0 of the intermediate layer 23 is set to the "thickness next thicker than 0 nm". This is because, as described above, the red transmission filter has a larger change of color under the deviation of the thickness t0 than the blue transmission filter. Specifically, the thickness t0 is set to e.g. approximately 12 nm. Thus, the intermediate layer 23 in the red transmission filter is set not to 134 nm but to thinner 12 nm. This can reduce the color change under the variation of the thickness t0. Hence, in the red transmission filter, the thickness t0 is preferably set to 12 nm.

In the blue transmission filter, the thickness t0 of the intermediate layer 23 is set to the "thickness next thicker than the thickness t0 of the intermediate layer 23 in the red transmission filter". Specifically, the thickness t0 is set to approximately 84 nm. Here, in the blue transmission filter, the color change is small in the case where the thickness t0 deviates to the minus side, and the color change is large in the case of the deviation to the plus side. Hence, the target value of the thickness t0 of the intermediate layer 23 in the blue transmission filter is preferably set smaller than the thickness corresponding to the blue of NTSC. This can reduce the color change in the case where the thickness t0 deviates to the plus side. Thus, the overall color change can be reduced.

That is, the second distance tb (green) is 0. The third distance tc (red) is approximately 12 nm. The first distance ta (blue) is in the range from approximately 76 nm to approximately 84 nm. That is, the thickness t0 is set to satisfy the relation tb (green)<tc (red)<ta (blue).

By the interference filter 312 according to the embodiment, an interference filter with stable characteristic can be provided.

Figure 13A:
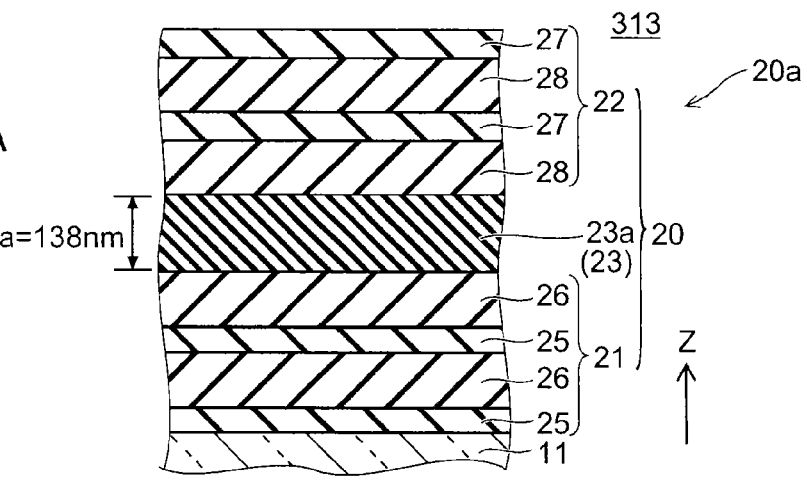
FIG. 13A to FIG. 13C are schematic sectional views showing the configuration of another interference filter according to the first embodiment.
Figure 13B:
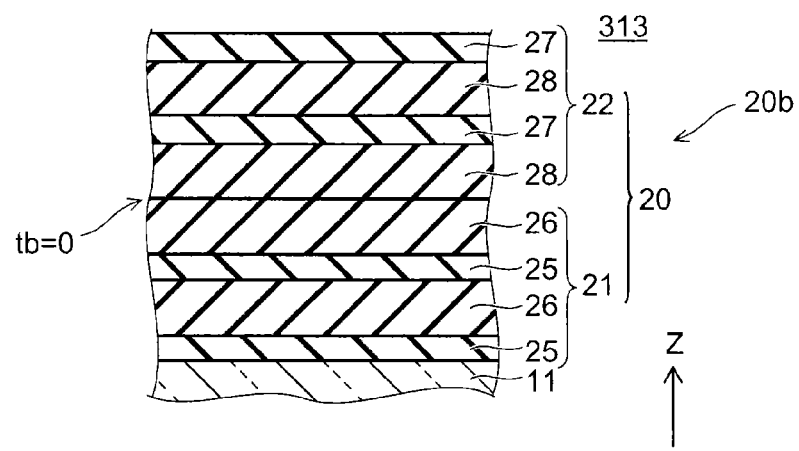
Figure 13C:
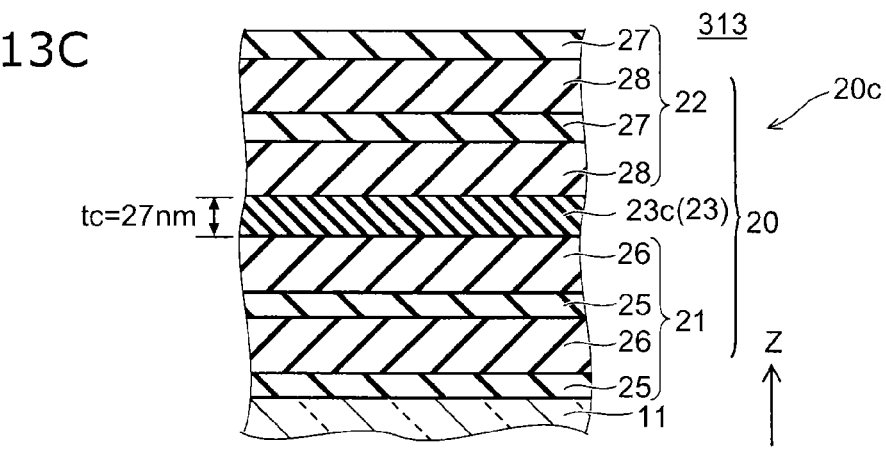

FIG. 13A to FIG. 13C are schematic sectional views illustrating the configuration of an alternative interference filter according to the first embodiment.

FIG. 13A to FIG. 13C illustrate the configuration of a wavelength selective transmission layer in the first to third regions 20a-20c, respectively.

As shown in FIG. 13A to FIG. 13C, in the alternative interference filter 313 according to the embodiment, the lower semi-transmissive layer 21 includes two first dielectric films 25 and two second dielectric films 26 stacked with each other. Furthermore, the upper semi-transmissive layer 22 includes two third dielectric films 27 and two fourth dielectric films 28 stacked with each other. The intermediate layer 23 is in contact with the second dielectric film 26 and the fourth dielectric film 28. In this example, the refractive index of the intermediate layer 23 is higher than the refractive index of the second dielectric film 26 (low refractive index film) and the fourth dielectric film 28 (low refractive index film).

The refractive index and thickness of the first to fourth dielectric films 25, 26, 27, and 28 are the same as those described with reference to e.g. the interference filter 311.

As shown in FIG. 13A, the thickness of the intermediate layer 23 in the first region 20a (i.e., first distance ta) is approximately 138 nm. As shown in FIG. 13B, in the second region 20b, the intermediate layer 23 is not provided, and the second distance tb is 0. As shown in FIG. 13C, the thickness of the intermediate layer 23 in the third region 20c (i.e., third distance tc) is approximately 27 nm.

Figure 14:
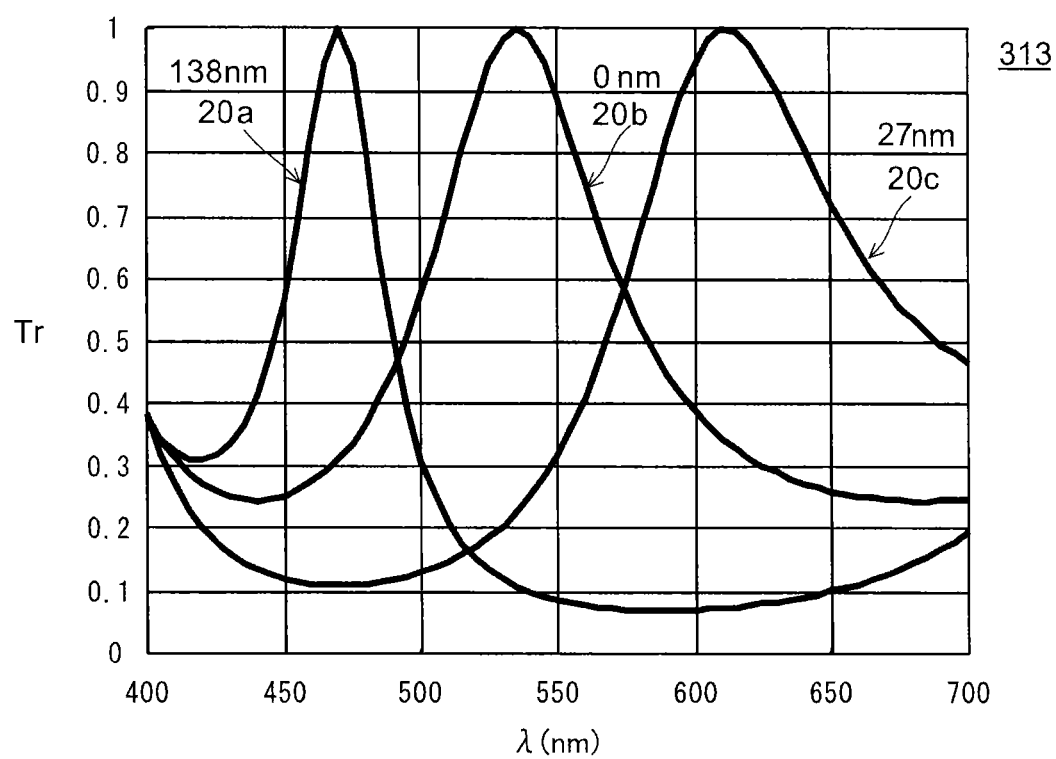
FIG. 14 is a graph showing the characteristic of the another interference filter according to the first embodiment.

FIG. 14 is a graph illustrating the characteristic of the alternative interference filter according to the first embodiment. As shown in FIG. 14, the interference filter 313 achieves a good characteristic transmitting blue, green, and red in the first region 20a, the second region 20b, and the third region 20c, respectively.

Also by the interference filter 313, an interference filter with stable characteristic can be provided.

(Second Embodiment)

The embodiment relates to a display device.

FIG. 15 is a schematic sectional view illustrating the configuration of a display device according to a second embodiment.

As shown in FIG. 15, the display device 110 according to the embodiment includes the interference filter (e.g., interference filter 310) according to the first embodiment, a wavelength selective absorption layer 40, and a light control layer 50.

The wavelength selective absorption layer 40 is stacked with the base body 11. The light control layer 50 is stacked with the base body 11. In this example, the light control layer 50 is provided between the wavelength selective transmission layer 20 of the interference filter 310 and the wavelength selective absorption layer 40.

The light control layer 50 is made of e.g. a liquid crystal layer. The light control layer 50 controls the intensity of light passing through each of the first region 20a, the second region 20b, and the third region 20c. Besides liquid crystal, the light control layer 50 can also be made of e.g. a mechanical shutter based on MEMS (Micro Electro Mechanical systems). Thus, in the embodiment, the configuration of the light control layer 50 is arbitrary.

The wavelength selective absorption layer 40 includes a blue first absorption layer 40a, a green second absorption layer 40b, and a red third absorption layer 40c. The first absorption layer 40a includes a portion overlapping the first region 20a as viewed along the Z-axis (the direction perpendicular to the major surface 11a). The second absorption layer 40b includes a portion overlapping the second region 20b as viewed along the Z-axis direction. The third absorption layer 40c includes a portion overlapping the third region 20c as viewed along the Z-axis direction.

Figure 16A:
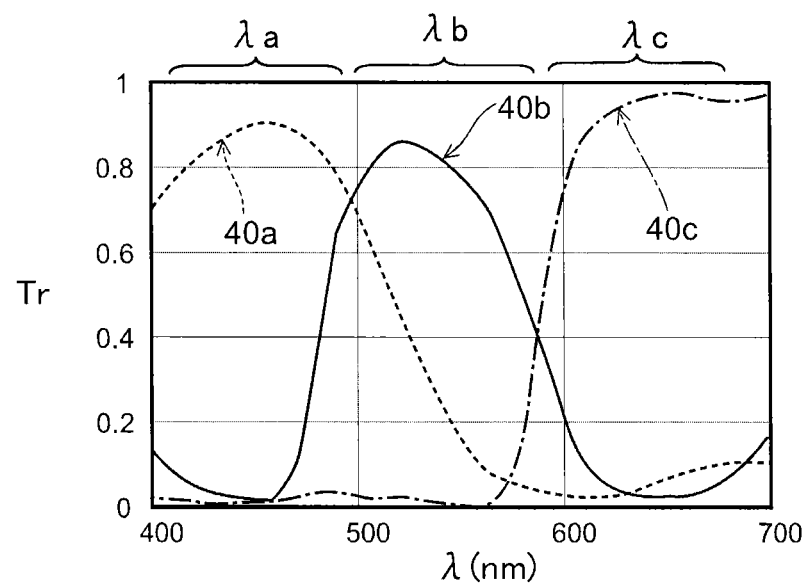
FIG. 16A and FIG. 16B are graphs showing the characteristic of a wavelength selective absorption layer of a part of the display device according to the second embodiment.
Figure 16B:
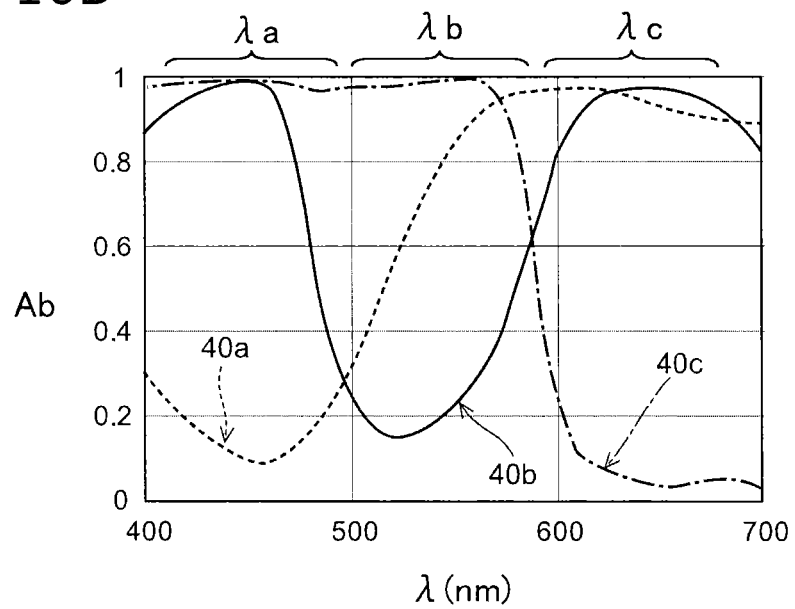

FIG. 16A and FIG. 16B are graphs illustrating the characteristic of a part of the display device according to the second embodiment.

These figures illustrate the characteristic of the wavelength selective absorption layer 40. FIG. 16A shows a transmission spectrum. FIG. 16B shows an absorption spectrum. In these figures, the horizontal axis represents wavelength λ. The vertical axis of FIG. 16A represents transmittance Tr. The vertical axis of FIG. 16B represents absorptance Ab. The first wavelength band λa, the second wavelength band λb, and the third wavelength band λc correspond to the blue wavelength band, the green wavelength band, and the red wavelength band, respectively.

As shown in FIG. 16A, the first absorption layer 40a, the second absorption layer 40b, and the third absorption layer 40c have a high transmittance Tr in the first wavelength band λa, the second wavelength band λb, and the third wavelength band λc, respectively. The first absorption layer 40a, the second absorption layer 40b, and the third absorption layer 40c are absorption type color filters for blue, green, and red, respectively.

As shown in FIG. 16B, the absorptance Ab of the first absorption layer 40a for light in the first wavelength band λa is lower than the absorptance Ab of the first absorption layer 40a for light in the visible wavelength band except the first wavelength band λa. The absorptance Ab of the second absorption layer 40b for light in the second wavelength band λb is lower than the absorptance Ab of the second absorption layer 40b for light in the visible wavelength band except the second wavelength band λb. The absorptance Ab of the third absorption layer 40c for light in the third wavelength band λc is lower than the absorptance Ab of the third absorption layer 40c for light in the visible wavelength band except the third wavelength band λc.

The wavelength selective transmission layer 20 described with reference to the first embodiment and the wavelength selective absorption layer 40 having the characteristics illustrated in FIG. 16A and FIG. 16B are stacked. Thus, as described later, the light utilization ratio is increased.

The example of the display device 110 illustrated in FIG. 15 is further described.

The main substrate 10 includes a base body 11, a wavelength selective transmission layer 20, and a circuit layer 30. The circuit layer 30 is provided on the wavelength selective transmission layer 20. That is, the wavelength selective transmission layer 20 is provided between the base body 11 and the circuit layer 30.

The circuit layer 30 includes a plurality of pixel regions. In this example, the circuit layer 30 includes a first pixel region 30a, a second pixel region 30b, and a third pixel region 30c. As viewed along the Z-axis direction, the first pixel region 30a, the second pixel region 30b, and the third pixel region 30c include a portion overlapping the first region 20a, the second region 20b, and the third region 20c, respectively.

As illustrated in FIG. 15, in this example, an opposed substrate 12 opposed to the major surface 11a of the main substrate 10 is provided. On the opposed major surface 12a (the surface opposed to the major surface 11a) of the opposed substrate 12, a wavelength selective absorption layer 40 is provided.

The wavelength selective absorption layer 40 includes a first absorption layer 40a, a second absorption layer 40b, and a third absorption layer 40c.

The first absorption layer 40a includes a portion overlapping a first pixel electrode 31a as viewed along e.g. the Z-axis direction. The second absorption layer 40b includes a portion overlapping a second pixel electrode 31b as viewed along e.g. the Z-axis direction. The third absorption layer 40c includes a portion overlapping a third pixel electrode 31c as viewed along e.g. the Z-axis direction.

In this example, a light control layer 50 is provided between the wavelength selective absorption layer 40 and the main substrate 10. A counter electrode 13 is provided between the wavelength selective absorption layer 40 and the light control layer 50. The counter electrode 13 is provided on the wavelength selective absorption layer 40 provided on the opposed major surface 12a of the opposed substrate 12. Alternatively, the wavelength selective absorption layer 40 may be provided on the main substrate 10. The wavelength selective absorption layer 40 may be provided between the circuit layer 30 and the wavelength selective transmission layer 20.

Figure 17:
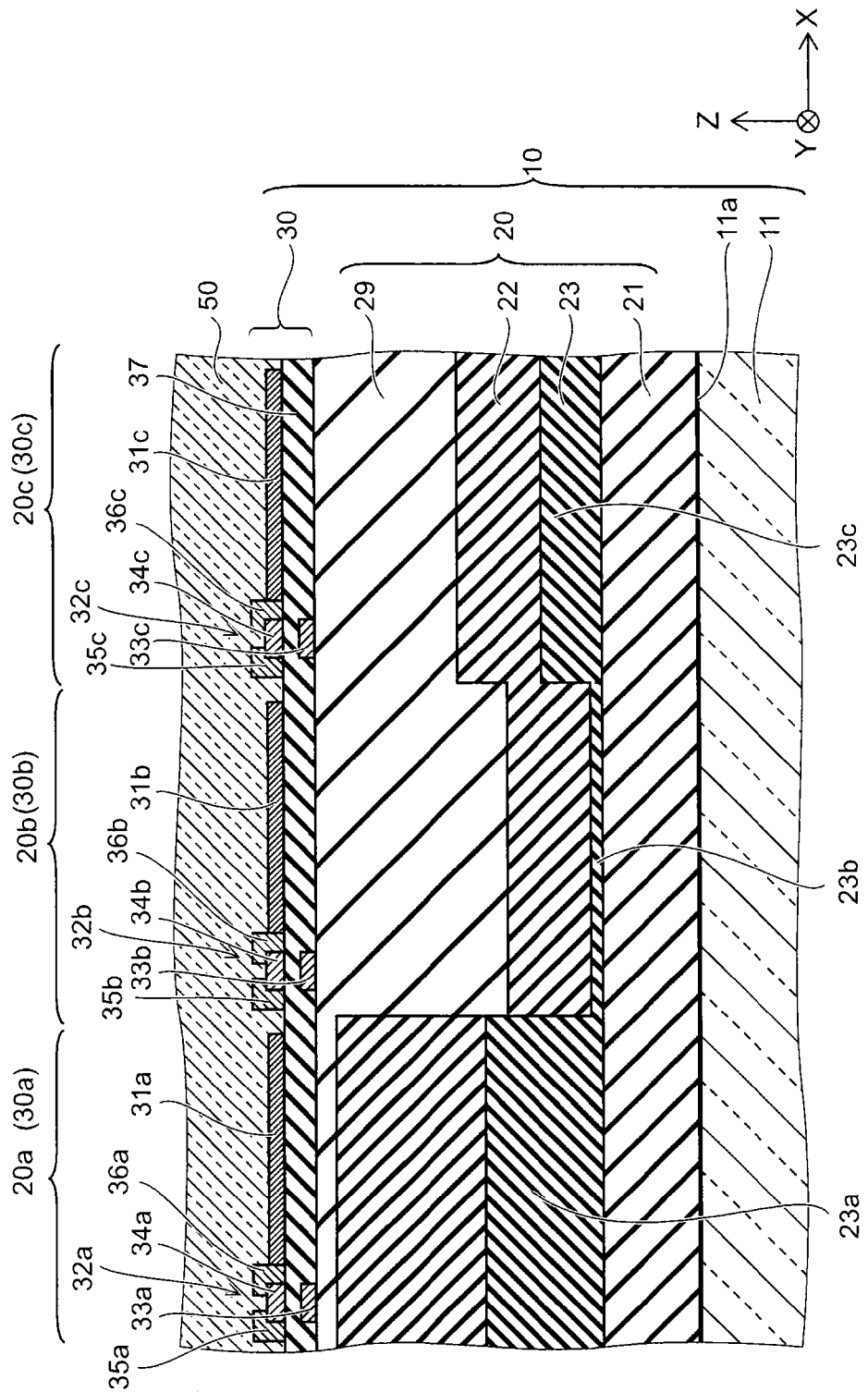
FIG. 17 is a schematic sectional view showing the display device according to the second embodiment.

FIG. 17 is a schematic sectional view illustrating the configuration of the display device according to the second embodiment.

This figure shows an enlarged view of an example configuration of the main substrate 10.

As illustrated in FIG. 17, a first spacer layer 23a and a third spacer layer 23c are provided. Although a second spacer layer 23b is shown in FIG. 17, the second spacer layer 23b may be omitted.

As shown in FIG. 17, in addition to the first to third pixel electrodes 31a, 31b, and 31c, the circuit layer 30 further includes first to third switching elements 32a, 32b, and 32c.

The first to third switching elements 32a-32c are connected to the first to third pixel electrodes 31a-31c, respectively. The first to third switching elements 32a-32c are made of a transistor (e.g., thin film transistor).

Specifically, the first switching element 32a includes a first gate 33a, a first semiconductor layer 34a, a first signal line side end portion 35a, and a first pixel side end portion 36a. The second switching element 32b includes a second gate 33b, a second semiconductor layer 34b, a second signal line side end portion 35b, and a second pixel side end portion 36b. The third switching element 32c includes a third gate 33c, a third semiconductor layer 34c, a third signal line side end portion 35c, and a third pixel side end portion 36c.

The first to third gates 33a-33c are connected to e.g. a scan line (not shown). The first to third signal line side end portions 35a-35c are connected to e.g. a plurality of signal lines (not shown), respectively. A gate insulating film 37 is provided between the first gate 33a and the first semiconductor layer 34a, between the second gate 33b and the second semiconductor layer 34b, and between the third gate 33c and the third semiconductor layer 34c.

The first to third semiconductor layers 34a-34c are made of a semiconductor such as amorphous silicon or polysilicon.

The first signal line side end portion 35a is one of the source and the drain of the first switching element 32a. The first pixel side end portion 36a is the other of the source and the drain of the first switching element 32a. The second signal line side end portion 35b is one of the source and the drain of the second switching element 32b. The second pixel side end portion 36b is the other of the source and the drain of the second switching element 32b. The third signal line side end portion 35c is one of the source and the drain of the third switching element 32c. The third pixel side end portion 36c is the other of the source and the drain of the third switching element 32c.

The first to third pixel side end portions 36a-36c are electrically connected to the first to third pixel electrodes 31a-31c, respectively.

The circuit layer 30 may further include an auxiliary capacitance line, not shown. The circuit layer 30 may further include a control circuit for controlling the operation of the switching elements.

For instance, through the switching element (first to third switching elements 32a-32c) connected to each pixel electrode (first to third pixel electrodes 31a-31c), the pixel electrode is supplied with a desired charge. A voltage is applied between each pixel electrode and the opposite electrode 13. A voltage (e.g., electric field) is applied to the light control layer 50. In response to the applied voltage (e.g., electric field), the optical characteristic of the light control layer 50 is changed. Thus, the transmittance of each pixel is changed, and display is performed.

In the case where the light control layer 50 is made of a liquid crystal layer, in response to the applied voltage (e.g., electric field), the orientation of the liquid crystal molecules in the liquid crystal layer is changed. In response to the change of the orientation, the optical characteristic of the liquid crystal layer (including at least one of birefringence index, optical rotatory power, scattering property, diffraction property, and absorption property) is changed.

As shown in FIG. 15, in this example, a first polarizing layer 61 and a second polarizing layer 62 are further provided. The main substrate 10, the wavelength selective absorption layer 40, and the light control layer 50 are disposed between the first polarizing layer 61 and the second polarizing layer 62. Thus, the change of the optical characteristic in the light control layer 50 (liquid crystal layer) is converted to the change of light transmittance, and display is performed. The position of the polarizing layer is arbitrary. Here, the counter electrode 13 may be provided on the main substrate 10. In this case, for instance, an electric field including a component parallel to the X-Y plane is applied to the light control layer 50 and changes the optical characteristic of the light control layer 50.

As shown in FIG. 15, the display device 110 according to the embodiment further includes an illumination unit 70. The illumination unit 70 makes illumination light 70L incident to the wavelength selective transmission layer 20 along the direction from the wavelength selective transmission layer 20 toward the wavelength selective absorption layer 40.

The illumination unit 70 includes e.g. a light source 73, an optical waveguide 71, an illumination reflection layer 72, and a traveling direction changing portion 74. The optical waveguide 71 is made of e.g. transparent acrylic resin.

The light source 73 generates light. The light source 73 is based on e.g. a semiconductor light emitting element (e.g., LED). The light source 73 is placed on e.g. the side surface of the optical waveguide 71. The optical waveguide 71 is placed between the illumination reflection layer 72 and the main substrate 10. The light generated in the light source 73 is injected into the optical waveguide 71. The light is propagated in the optical waveguide 71 while undergoing e.g. total reflection. The traveling direction changing portion 74 changes the traveling direction of the light propagated in the optical waveguide 71 and efficiently injects the light into the main substrate 10. The traveling direction changing portion 74 is made of a structural body having an uneven shape, such as a groove. For instance, part of the light changed in traveling direction by the traveling direction changing portion 74 travels toward the main substrate 10. Here, the light emitted from the light source 73 of the illumination unit 70 may be propagated in the base body 11, and the propagated light may be injected into the wavelength selective transmission layer 20.

The display device 110 illustrated in FIG. 15 is a liquid crystal display device using an interference filter of the Fabry-Perot type.

In the display device 110, the light injected from the light source 73 into the optical waveguide 71 is totally reflected at the interface between the optical waveguide 71 and air. Total reflection occurs at the upper and lower interfaces of the optical waveguide 71. Thus, the light is propagated in the optical waveguide 71. If the light traveling in the optical waveguide 71 is incident on the traveling direction changing portion 74 (such as a protrusion), the condition for total reflection is violated. The traveling direction of the light L1 reflected at the traveling direction changing portion 74 is changed to the display surface side (opposite substrate 12 side).

The light of a specific color component in the light L1 is transmitted through e.g. the first region 20a of the wavelength selective transmission layer 20. Here, if the light control layer 50 in the first pixel region 30a is placed in the transmissive state, the light is emitted out from the display surface. The light of the other color component in the light L1 cannot be transmitted through the first region 20a, but reflected by the wavelength selective transmission layer 20 in the first region 20a and injected into the optical waveguide 71. This reflected light L2 is reflected by the illumination reflection layer 72 and repeats multiple reflection between the wavelength selective transmission layer 20 and the illumination reflection layer 72. In the region capable of transmitting the light having the wavelength of the light L2 (e.g., second region 20b), the light L2 is transmitted through e.g. the second region 20b. If the light control layer 50 in the second pixel region 30b is placed in the transmissive state, the light is emitted out from the display surface.

Thus, in the display device 110, by using the wavelength selective transmission layer 20, the light utilization efficiency is high.

That is, the light reaching the wavelength selective absorption layer 40 has been transmitted through the wavelength selective transmission layer 20. Hence, its wavelength characteristic has been adapted to the absorption characteristic of the wavelength selective absorption layer 40. Thus, the light component absorbed by the wavelength selective absorption layer 40 is made lower than in the case without the wavelength selective transmission layer 20. Hence, the optical loss can be suppressed. Furthermore, even if the absorptance Ab of the wavelength selective absorption layer 40 is low, a desired color characteristic (e.g., color reproducibility) can be achieved.

In the display device 110, the interference filter (e.g., interference filter 310) according to the first embodiment is used. Hence, even if the thickness t0 of the intermediate layer 23 is varied, the change of the optical characteristic (color change) is suppressed. Thus, a display device with stable characteristic and reduced power consumption can be provided.

FIG. 18 is a schematic sectional view illustrating the configuration of a display device according to the second embodiment.

As shown in FIG. 18, the display device 111 uses e.g. the interference filter 312 or 313 according to the first embodiment as an interference filter. That is, the second spacer layer 23b is not provided, and the second distance tb is set to 0. Thus, a display device with stable characteristic and reduced power consumption can be provided.

The display device according to the embodiment is applicable as a display of a personal computer and a display device of a small TV set. In particular, in battery powered equipment, reduction of power consumption is desired. By using the display device according to the embodiment, the power consumption of the backlight can be reduced. This can contribute to reduced power consumption.

According to the embodiments, an interference filter and a display device with stable characteristics are provided.

The embodiments of the invention have been described above with reference to examples. However, the embodiments of the invention are not limited to these examples. For instance, any specific configurations of various components such as the base body, wavelength selective transmission layer, lower semi-transmissive layer, upper semi-transmissive layer, intermediate layer, dielectric film, and spacer layer included in the interference filter, and the wavelength selective absorption layer, circuit layer, pixel electrode, switching element, light control layer, opposite substrate, and illumination unit included in the display device are encompassed within the scope of the invention as long as those skilled in the art can similarly practice the invention and achieve similar effects by suitably selecting such configurations from conventionally known ones.

Further, any two or more components of the specific examples may be combined within the extent of technical feasibility and are included in the scope of the invention to the extent that the purport of the invention is included.

In addition, those skilled in the art can suitably modify and implement the interference filter and the display device described above in the embodiments of the invention. All the interference filters and the display devices thus modified are also encompassed within the scope of the invention as long as they fall within the spirit of the invention.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An interference filter comprising:
a base body including a major surface;
a lower semi-transmissive layer provided on the major surface; and
an upper semi-transmissive layer provided on the lower semi-transmissive layer,
the base body, the lower semi-transmissive layer and the upper semi-transmissive layer forming a first region to selectively transmit blue light, a second region to selectively transmit green light, and a third region to selectively transmit red light, the first region, the second region and the third region being arranged in a plane parallel to the major surface, and
a distance between the lower semi-transmissive layer and the upper semi-transmissive layer in the second region being shorter than a distance between the lower semi-transmissive layer and the upper semi-transmissive layer in the first region, and shorter than a distance between the lower semi-transmissive layer and the upper semi-transmissive layer in the third region,
wherein the distance between the lower semi-transmissive layer and the upper semi-transmissive layer in the second region is zero, and
wherein the distance between the lower semi-transmissive layer and the upper semi-transmissive layer in the third region is 10.8 nanometers or more and 13.2 nanometers or less.

2. The filter according to claim 1, wherein the distance between the lower semi-transmissive layer and the upper semi-transmissive layer in the third region is shorter than the distance between the lower semi-transmissive layer and the upper semi-transmissive layer in the first region.

3. The filter according to claim 1, wherein the distance between the lower semi-transmissive layer and the upper semi-transmissive layer in the first region is 76 nanometers or more and 84 nanometers or less.

4. The filter according to claim 1, further comprising:
a first spacer layer provided between the lower semi-transmissive layer and the upper semi-transmissive layer in the first region; and
a third spacer layer provided between the lower semi-transmissive layer and the upper semi-transmissive layer in the third region.

5. The filter according to claim 1, wherein
the base body, the lower semi-transmissive layer and the upper semi-transmissive layer form the first region in a plurality, the second region in a plurality, and the third region in a plurality, and
the plurality of first regions, the plurality of second regions, and the plurality of third regions are periodically disposed along at least one direction in the plane.

6. The filter according to claim 1, wherein the lower semi-transmissive layer includes:
a first dielectric film; and
a second dielectric film stacked with the first dielectric film and having a refractive index different from a refractive index of the first dielectric film.

7. The filter according to claim 6, wherein
the first dielectric film includes $TiO_2$, and
the second dielectric film includes $SiO_2$.

8. The filter according to claim 6, wherein the upper semi-transmissive layer includes:
a third dielectric film;
a fourth dielectric film stacked with the third dielectric film and having a refractive index different from a refractive index different from the third dielectric film.

9. The filter according to claim 6, wherein
the first dielectric film and the second dielectric film are provided in a plurality in the lower semi-transmissive layer, and
the plurality of first dielectric films and the plurality of second dielectric films are alternately stacked.

10. An interference filter comprising:
a base body including a major surface;
a lower semi-transmissive layer provided on the major surface;
an upper semi-transmissive layer provided on the lower semi-transmissive layer; and
a first spacer layer provided between the lower semi-transmissive layer and the upper semi-transmissive layer in the first region,
the base body, the lower semi-transmissive layer and the upper semi-transmissive layer forming a first region to selectively transmit blue light, a second region to selectively transmit green light, and a third region to selectively transmit red light, the first region, the second region and the third region being arranged in a plane parallel to the major surface,
a distance between the lower semi-transmissive layer and the upper semi-transmissive layer in the second region being shorter than a distance between the lower semi-transmissive layer and the upper semi-transmissive layer in the first region, and shorter than a distance between the lower semi-transmissive layer and the upper semi-transmissive layer in the third region, and
a product of the distance in the first region and a refractive index of the first spacer layer is 105.8 nanometers or more and less than 117.5 nanometers.

11. A display device comprising:
an interference filter including:
a base body including a major surface;
a lower semi-transmissive layer provided on the major surface; and
an upper semi-transmissive layer provided on the lower semi-transmissive layer,
the base body, the lower semi-transmissive layer, and the upper semi-transmissive layer forming a first region to selectively transmit blue light, a second region to selectively transmit green light, and a third region to selectively transmit red light, the first region, the second region and the third region being arranged in a plane parallel to the major surface, and
a distance between the lower semi-transmissive layer and the upper semi-transmissive layer in the second region being shorter than a distance between the lower semi-transmissive layer and the upper semi-transmissive layer in the first region, and shorter than a distance between the lower semi-transmissive layer and the upper semi-transmissive layer in the third region;
a first spacer layer provided between the lower semi-transmissive layer and the upper semi-transmissive layer in the first region;
a wavelength selective absorption layer stacked with the base body; and
a light control layer stacked with the base body,
the wavelength selective absorption layer including:
a blue first absorption layer including a portion overlapping the first region as viewed along a first direction perpendicular to the major surface;
a green second absorption layer including a portion overlapping the second region as viewed along the first direction; and a red third absorption layer including a portion overlapping the third region as viewed along the first direction, and the light control layer controlling an intensity of a light passing through each of the first region, the second region, and the third region, a product of the distance in the first region and a refractive index of the first spacer layer being 105.8 nanometers or more and less than 117.5 nanometers.

12. The device according to claim 11, wherein the light control layer includes a liquid crystal layer.

13. The device according to claim 11, wherein the distance between the lower semi-transmissive layer and the upper semi-transmissive layer in the third region is shorter than the distance between the lower semi-transmissive layer and the upper semi-transmissive layer in the first region.

14. The device according to claim 11, wherein the distance between the lower semi-transmissive layer and the upper semi-transmissive layer in the second region is zero.

15. The device according to claim 11, further comprising:

a first spacer layer provided between the lower semi-transmissive layer and the upper semi-transmissive layer in the first region; and a third spacer layer provided between the lower semi-transmissive layer and the upper semi-transmissive layer in the third region.

16. The device according to claim 11, wherein the first region, the second region, and the third region are each provided in a plurality, and the plurality of first regions, the plurality of second regions, and the plurality of third regions are periodically disposed along at least one direction in the plane.

17. The device according to claim 11, wherein the lower semi-transmissive layer includes:

a first dielectric film; and a second dielectric film stacked with the first dielectric film and having a refractive index different from a refractive index of the first dielectric film.

* * * * *